United States Patent
Kimura

(10) Patent No.: US 9,413,996 B2
(45) Date of Patent: Aug. 9, 2016

(54) IMAGE PICKUP APPARATUS, AND CONTROL METHOD THEREOF

(71) Applicant: CANON KABUSHIKI KAISHA, Tokyo (JP)

(72) Inventor: Masafumi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/818,632

(22) Filed: Aug. 5, 2015

(65) Prior Publication Data

US 2016/0037102 A1 Feb. 4, 2016

Related U.S. Application Data

(62) Division of application No. 13/705,992, filed on Dec. 5, 2012, now Pat. No. 9,131,130.

(30) Foreign Application Priority Data

Dec. 19, 2011 (JP) .................................. 2011-277119

(51) Int. Cl.
*H04N 9/64* (2006.01)
*H04N 5/367* (2011.01)
*H04N 5/217* (2011.01)

(52) U.S. Cl.
CPC ........... *H04N 5/3675* (2013.01); *H04N 5/2173* (2013.01); *H04N 5/367* (2013.01)

(58) Field of Classification Search
USPC ......................................................... 348/247
See application file for complete search history.

(56) References Cited

U.S. PATENT DOCUMENTS

| 7,732,744 | B2 | 6/2010 | Utagawa |
| 7,872,679 | B2 | 1/2011 | Hara |
| 8,031,968 | B2 | 10/2011 | Ishiga |
| 8,477,233 | B2 | 7/2013 | Oikawa |
| 8,531,560 | B2 | 9/2013 | Kimura |
| 2010/0092103 | A1 | 4/2010 | Ishiga |
| 2011/0164166 | A1 | 7/2011 | Oikawa |
| 2011/0228145 | A1 | 9/2011 | Kimura |

FOREIGN PATENT DOCUMENTS

| CN | 101127840 A | 2/2008 |
| CN | 101889231 A | 11/2010 |
| CN | 102246079 A | 11/2011 |
| JP | 2007-004471 A | 1/2007 |

OTHER PUBLICATIONS

Chinese Office Action dated May 6, 2015, issued in counterpart Chinese Patent Application No. 2012105446626, with an English translation.

*Primary Examiner* — Roberto Velez
*Assistant Examiner* — Stephen Coleman
(74) *Attorney, Agent, or Firm* — Fitzpatrick, Cella, Harper & Scinto

(57) ABSTRACT

An image processing apparatus obtains an image signal of an image pickup element having a pupil division unit that restricts light of an optical image of an object arriving at each pixel of the element to light from a specific pupil area of a photographing lens. A memory unit stores information of a pixel defect of the element. An image shift unit determines a shift amount of the image signal of the photographed object corresponding to an image re-formation plane for every pupil area, to shift the image signal on the basis of the plane. A defect correction unit corrects an image signal of a defective pixel using the shifted image signal of a pixel other than the defective pixel, in accordance with the information of the pixel defect. An image re-formation unit re-forms an image corresponding to the image re-formation plane from the corrected image signal.

27 Claims, 21 Drawing Sheets

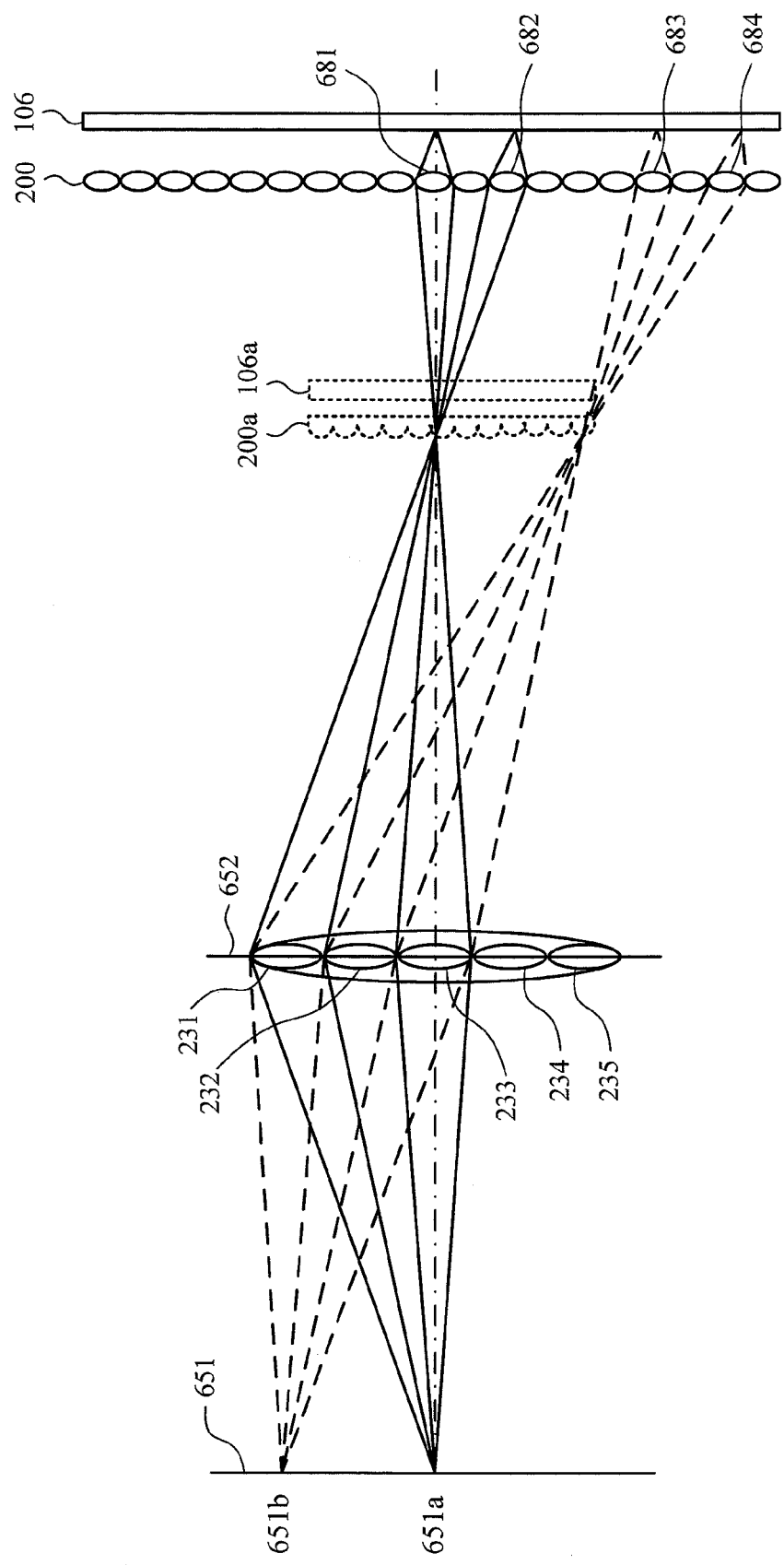

IMAGE PICKUP APPARATUS, AND CONTROL METHOD THEREOF

CLAIM OF PRIORITY

This application is a divisional application of copending U.S. patent application Ser. No. 13/705,992, filed Dec. 5, 2012, which published as U.S. Patent Application Publication No. 2013/0162866 A1 on Jun. 27, 2013.

This application also claims the benefit of Japanese Patent Application No. 2011-277119, filed on Dec. 19, 2011, which is hereby incorporated by reference herein in its entirety.

BACKGROUND OF THE INVENTION

1. Field of the Invention

The present invention relates to an image pickup apparatus having an image pickup element, such as a digital camera, and more specifically, to an image pickup apparatus having a function of correction processing of a pixel defect of an image pickup element.

2. Description of the Related Art

In an image pickup element that is used in a digital camera, it is very difficult to prevent a pixel defect itself from being formed. In the meantime, there is an increasing need for measures against the pixel defect due to a tendency toward a larger number of pixels (an increase in the number of defects) and a tendency to more narrow a pixel pitch (an increase in a defect ratio), in recent years. As characteristics required for the processing of the pixel defect, a high capability of processing a pixel defect and an appropriate processing load may be given, for example.

Further, an apparatus (called a light field camera), that re-forms an image by obtaining lights passing through different pupil areas and uses the re-formed image as an output image, has been suggested.

For example, Japanese Patent Application Laid-Open No. 2007-4471 discloses a method of picking up an object image by using an image pickup element that is capable of individually receiving lights passing through different pupil areas, and creating an image whose focus is adjusted after image pickup.

Further, "CCD camera technology" written by Yasuo Takemura, Radio Technology Corporation discloses a method of interpolating the pixel defect (details of the pixel defect will be described below) in horizontal and vertical directions and in an inter-frame manner.

However, according to the related art disclosed in the '471 document described above, when a pixel defect occurs in an image pickup element that forms an image pickup system for obtaining lights passing through different pupil areas, a proper image may not always be obtained.

In other words, in the '471 document, even though an image in which a focus position is changed after image pickup may be obtained, a method of obtaining an image excluding an influence of a defected portion in a case when a pixel defect is present is not disclosed. Further, in the Takemura article, since the interpolation processing is performed on the basis of simple image correlation, appropriate interpolation may not be performed on the image pickup element that forms an image pickup system of the '471 document.

SUMMARY OF THE INVENTION

It is an aspect of the invention to provide an image pickup apparatus that is capable of obtaining a high quality image, in which influence by the pixel defect is reduced, even when using an image pickup element that is capable of obtaining information on lights passing through different pupil areas.

In order to achieve the aspect of the invention, an image pickup apparatus of the invention, which includes a photographing optical system having a photographing lens and an image pickup element that photoelectrically converts an optical image of an object arriving through the photographing lens to output an image signal, comprises a memory unit that stores information on a pixel defect of the image pickup element and information for determining an angle of incidence of the optical image arriving at each pixel of the image pickup element, an image generation position setting unit that sets an image generation position where a re-formed image is generated from the image signal, a pupil division unit that restricts light of the optical image of the object arriving at each pixel of the image pickup element to a light from a specific pupil area of the photographing lens, an image shift unit that determines a shift amount of the image signal corresponding to the image generation position for every pupil area to shift the image signal, on the basis of the image generation position set by the image generation position setting unit and information for determining the angle of incidence of the optical image arriving at each pixel of the image pickup element, a defect correction unit that corrects an image signal of a defective image using an image signal of a pixel other than the defective pixel, obtained by the image shift unit, in accordance with the information on the pixel defect, and an image generation unit that generates an image corresponding to the image generation position from the image signal, which is corrected by the defect correction unit.

Further features of the present invention will become apparent from the following description of exemplary embodiments with reference to the attached drawings.

BRIEF DESCRIPTION OF THE DRAWINGS

FIGS. 6A, 6B, and 6C are views schematically illustrating image generation in an image pickup system.

DESCRIPTION OF THE EMBODIMENTS

Exemplary embodiments of the present invention will be described in detail in accordance with the accompanying drawings.

First Embodiment

Hereafter, a photographing apparatus according to a first embodiment of the invention will be described with reference to FIGS. 1 to 6C.

Figure 1:
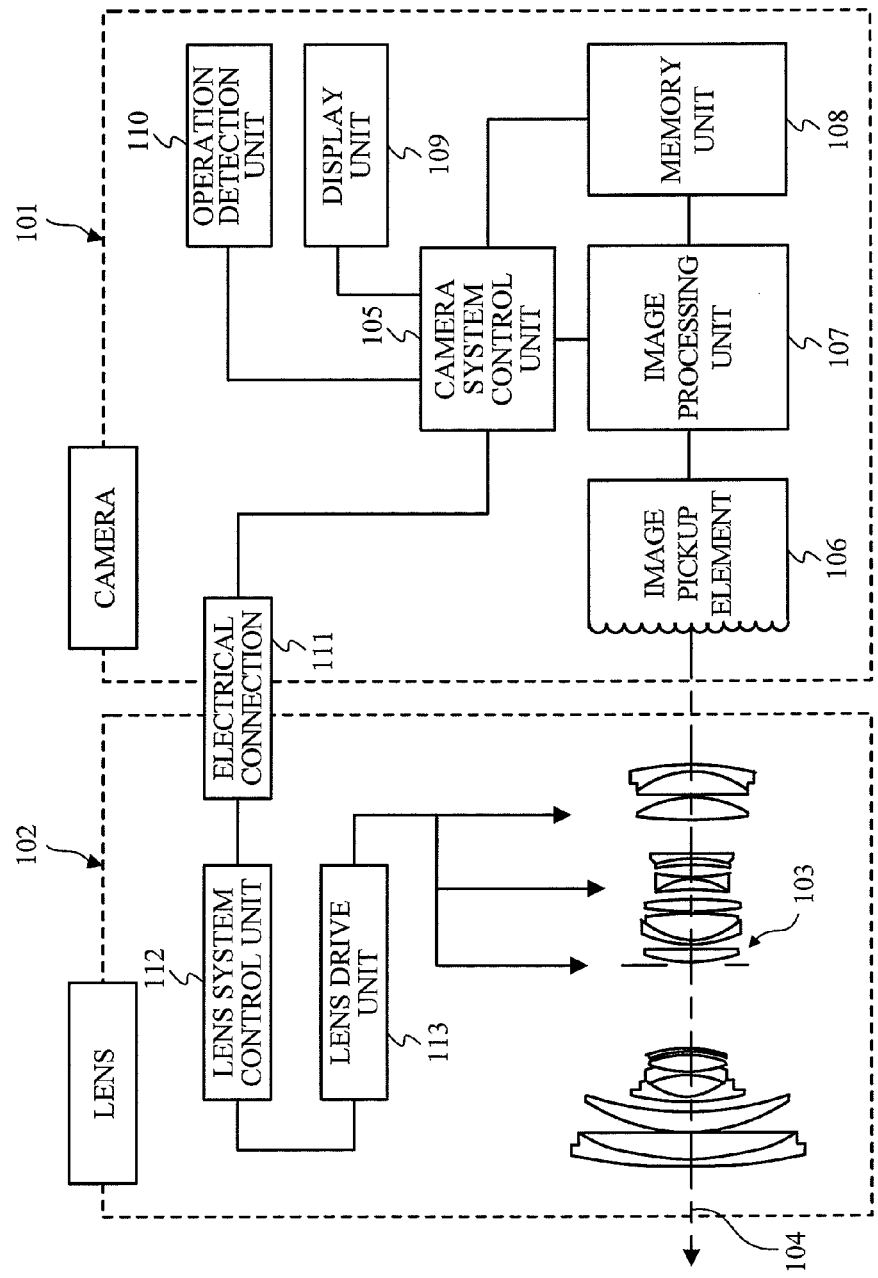
FIG. 1 is a block diagram illustrating a system configuration of a photographing apparatus according to an embodiment of the invention.

FIG. 1 is a block diagram illustrating a configuration of a camera system including a digital camera and a lens as a photographing apparatus according to the invention. The camera system includes an image pickup system for obtaining lights passing through different pupil areas and has a function of collecting an image defect, which is an object of the invention.

The camera system that includes a camera 101 and a lens 102 (photographing lens) includes an image pickup system, an image processing system, a recording and reproducing system, and a control system. The image pickup system includes a photographing optical system 103 and an image pickup element 106. The image processing system includes an image processing unit 107. The recording and reproducing system includes a memory unit 108 and a display unit 109. The control system includes a camera system control unit 105, an operation detection unit 110, a lens system control unit 112, and a lens drive unit 113. The lens drive unit 113 may drive a focus lens, a vibration correction lens, and an iris included in the photographing optical system 103.

The image pickup system is an optical processing system that focuses light from an object (optical image) on an image pickup plane of the image pickup element 106 through the photographing optical system 103. Micro lenses are arranged in a matrix form on a surface (light receiving surface) of the image pickup element 106 to form a micro lens array (hereafter, abbreviated as MLA). In this embodiment, the MLA functions as a pupil division unit that divides a plurality of pixels into a plurality of pixel groups in accordance with the respective micro lenses. Details of the function and arrangement of the MLA will be described below with reference to FIGS. 2A to 2C. However, a focus evaluation value/an appropriate exposure amount from the image pickup element 106 may be obtained by providing the pupil division unit, so that the photographing optical system 103 is appropriately adjusted on the basis of the obtained information. By doing this, it is possible to expose an object light with an appropriate light intensity to the image pickup element 106 and form an object image in the vicinity of the image pickup element 106.

The image processing unit 107 includes an A/D converter, a white balance circuit, a gamma correction circuit, and an interpolation operation circuit therein and creates a recording image by the image processing. Further, the image processing unit 107 may include an image shift unit, an image generation unit, a contrast evaluation unit, and a correlation calculation unit, which are main parts of this embodiment. In this embodiment, the above-mentioned elements are configured as a control program under the control of the camera system.

The memory unit 108 includes, not only a storage unit that actually stores data, but also a processing circuit that is required to record data. The memory unit 108 outputs an image to a recording unit and generates and stores an image to be output to the display unit 9. Further, the memory unit 108 compresses an image, a moving image, or an audio using a predetermined method.

The camera system control unit 105 generates and outputs a timing signal at the time of image pickup and controls the image pickup system, the image processing system, and the recording and reproducing system in response to external operation. For example, the operation detection unit 110 detects depression of a shutter release button, which is not illustrated, to control drive of the image pickup element 106 (photoelectric conversion), operation of the image processing unit 107, and compression processing of the memory unit 108. Further, the camera system control unit 105 also controls the state of segments of an information display device that displays information on a liquid crystal monitor by the display unit 109.

An adjustment operation of the optical system by the control system will be described. The camera system control unit 105 is connected with the image processing unit 107 to calculate a focus position and an iris position suitable for a photographing condition, on the basis of a signal from the image pickup element 106. The camera system control unit 105 transmits an instruction to the lens system control unit 112 through an electrical connection 111 and the lens system control unit 112 appropriately controls the lens drive unit 113 in accordance with the instruction. Further, a vibration detection sensor, which is not illustrated, is connected to the lens system control unit 112 to appropriately control a vibration correction lens through the lens drive unit 113, on the basis of a signal of the vibration detection sensor in a vibration correction mode.

Figure 2A:
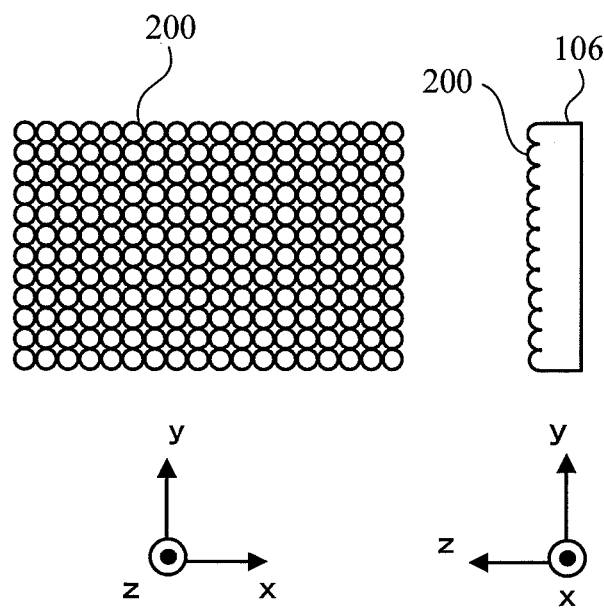
FIGS. 2A, 2B, and 2C are schematic diagrams of an image pickup system of a photographing apparatus according to a first embodiment of the invention.
Figure 2B:
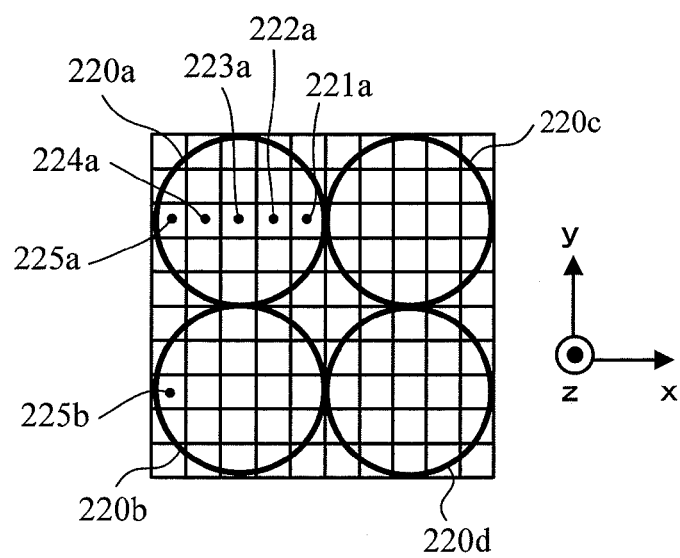
Figure 2C:
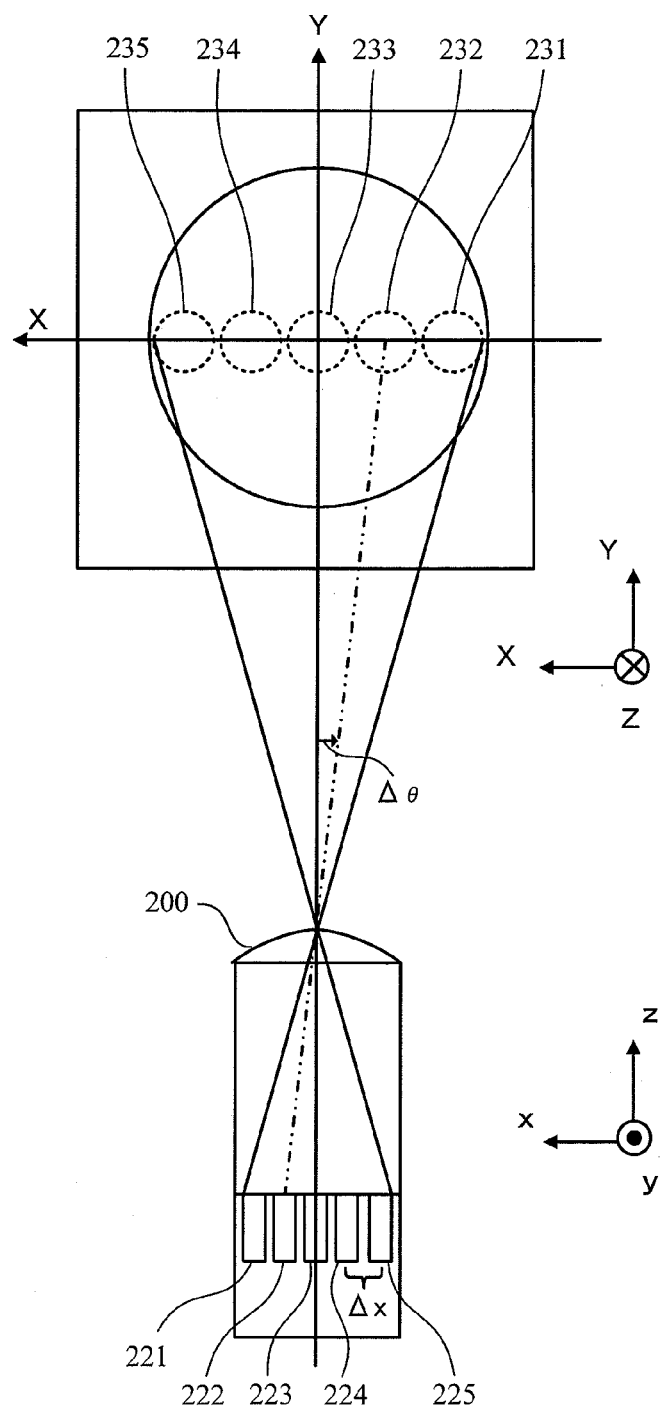

FIGS. 2A to 2C are diagrams illustrating main parts of the photographing optical system in the present embodiment of the invention. In FIGS. 2A to 2C, the same elements as those in FIG. 1 are denoted with the same reference numerals.

In order to apply the present invention to the camera system of FIG. 1, a configuration that obtains information of an angle in addition to a position of a ray of light, which is called light field information, is required. In the present embodiment, in order to obtain the angle information, the MLA is disposed in the vicinity of a focal plane of the photographing optical system 103 and a plurality of pixels correspond to one lens that forms the MLA.

FIG. 2A is a view schematically illustrating a correspondence relationship between the image pickup element 106 and the MLA 200. FIG. 2B is a view schematically illustrating a correspondence between a pixel of the image pickup element and the MLA. FIG. 2C is a conceptual view illustrating that a pixel provided below the MLA is associated with a specific pupil area by the MLA 200.

As illustrated in FIG. 2A, the MLA 200 is provided on the image pickup element 106 and a front principal point of the MLA 200 is positioned so as to be in the vicinity of the focal plane of the photographing optical system 103. FIG. 2A illustrates a side view of the photographing apparatus and a front view of the MLA 200. The lenses of the MLA 200 are arranged so as to cover the pixels on the image pickup element 106. In FIG. 2A, even though the micro lenses that form the MLA 200 are enlarged in order to be more recognizable, actually, each micro lens has a size several times larger than the pixel. The actual size will be described with reference to FIG. 2B.

FIG. 2B is a view that enlarges a part of the front view of the MLA 200 of FIG. 2A. Frames having a matrix form illustrated in FIG. 2B illustrate pixels of the image pickup element 106. In the meantime, the micro lenses that form the MLA 200 are represented by thick circles 220$a$, 220$b$, 220$c$, and 220$d$. As is apparent from FIG. 2B, a plurality of pixels are allocated to one micro lens and, in an example of FIG. 2B, twenty-five pixels (5 rows×5 columns) form one group correspondingly to one micro lens. In other words, a size of each of the micro lenses is 5 times×5 times of a size of the pixel.

FIG. 2C is a view illustrating a cross section of one micro lens when the image pickup element 106 is cut at such a plane that an optical axis of the micro lens is included, and a longitudinal direction (X-direction) of the image pickup element becomes a horizontal direction of the drawing. Reference numerals 221, 222, 223, 224, and 225 of FIG. 2C denote pixels (one photoelectric converting unit) of the image pickup element 106. In meantime, a drawing in the upper portion of FIG. 2C illustrates an exit pupil plane of the photographing optical system 3. Actually, if it is matched with a drawing of the image pickup element illustrated in a lower portion of FIG. 2C, in terms of direction, the exit pupil plane (X-Y plane) is parallel to a vertical direction (y direction) of the drawing of FIG. 2C. However, for the convenience of the description, the projective direction is changed. Further, in FIG. 2C, for the sake of simplicity of the description, one-dimensional projection/signal processing will be described. In other words, pupil division is of one dimension of only 231 to 235 and a corresponding pixel arrangement is also, for example, of one dimension of only 321a to 325a of FIG. 2B. This assumption is also applied to the description of FIGS. 5A to 5D. In an actual apparatus, this may be easily expanded to two dimensions.

The pixels 221, 222, 223, 224, and 225 of FIG. 2C may have a positional relationship to correspond to 221a, 222a, 223a, 224a, and 225a of FIG. 2B, respectively. As illustrated in FIG. 2C, the pixels are designed so as to be conjugate, by the micro lens 200, with a specific area on the exit pupil plane of the photographing optical system 103. In an example of FIG. 2C, the pixel 221 corresponds to the area 231, the pixel 222 corresponds to the area 232, the pixel 223 corresponds to the area 233, the pixel 224 corresponds to the area 234, and the pixel 225 corresponds to the area 235. In other words, only light passing through the area 231 on the exit pupil of the photographing optical system 103 arrives at the pixel 221. The other pixels are the same as those above. As a result, it is possible to obtain information of an angle on the basis of a relationship between a passage area on the pupil plane and the position on the image pickup element 106.

In the following description, for the sake of simplicity, symbols are introduced. As illustrated in FIG. 2C, a pixel pitch of the image pickup element 106 is denoted with x and an angular resolution is denoted with Δθ. Further, a division number of the angle is denoted with N (in the example of FIG. 2C, N=5). The pixel pitch is determined depending on a shape of the image pickup element 106 and Δθ is determined by a range where an angle of a ray of light is obtained and the division number of the angle. That is, the parameters are determined by only the physical structure of the image pickup system (structure of the image pickup element 106 and the MLA 200).

Using the photographing optical system illustrated in the present embodiment, a processing that obtains an image whose defect is appropriately processed from the signal of the image pickup element 106 will be described with reference to FIGS. 3A to 3E, 4A to 4C, and 5A to 5D.

Figure 3A:
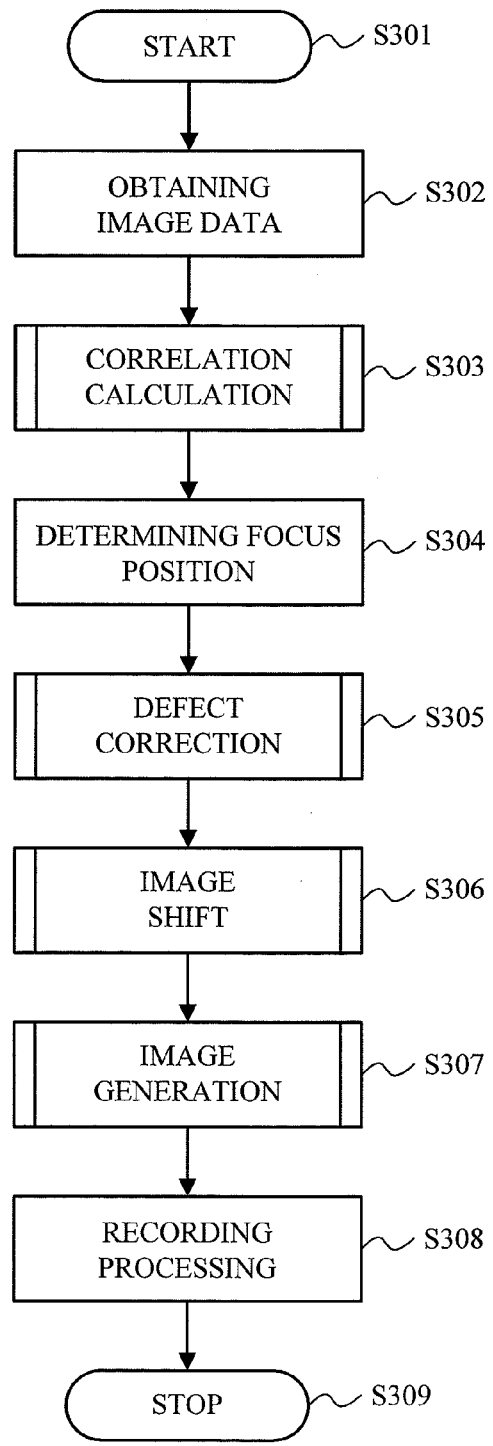
FIGS. 3A, 3B, 3C, 3D, and 3E are flowcharts of an image re-forming operation according to the first embodiment of the invention.
Figure 3B:
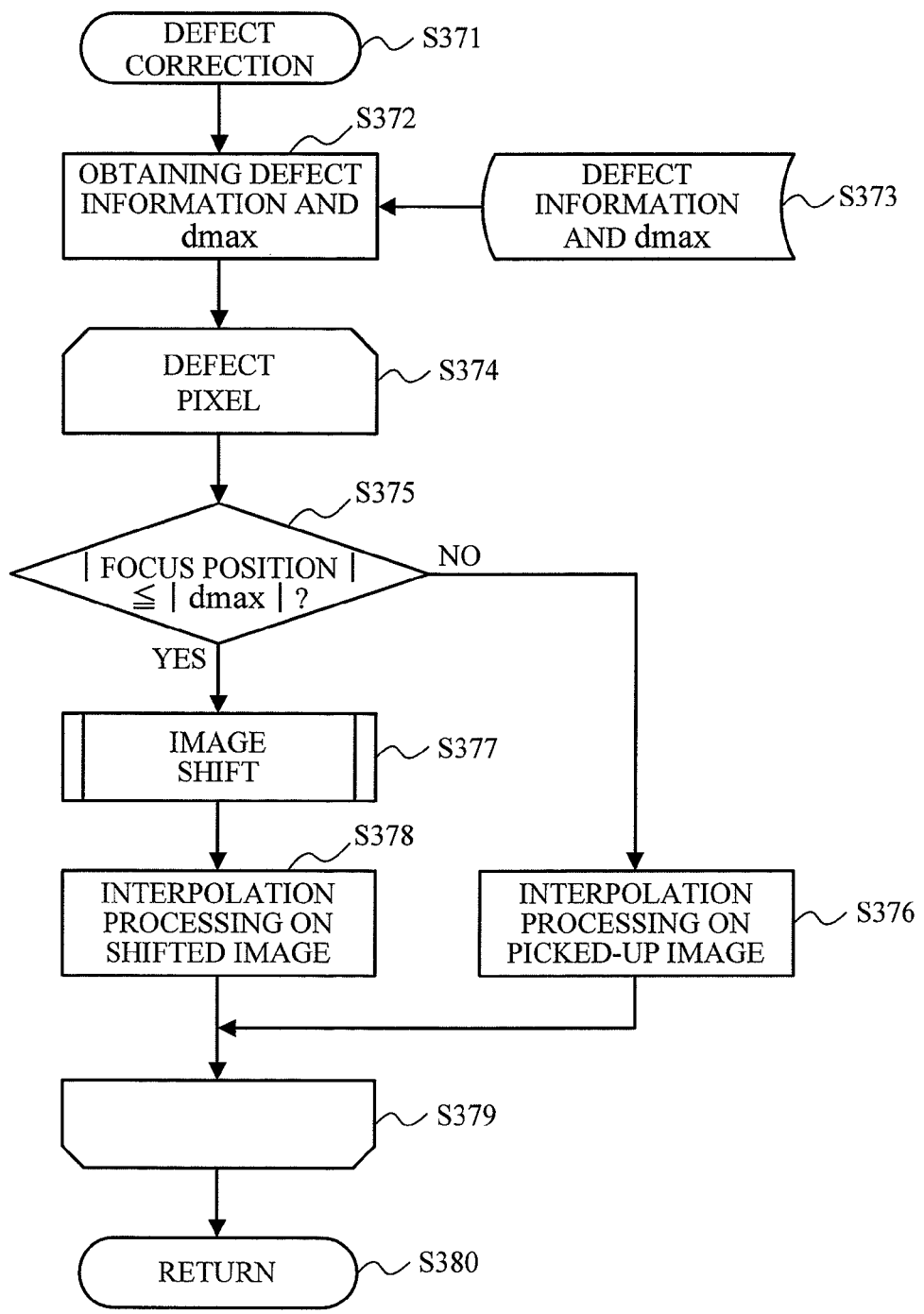
Figure 3C:
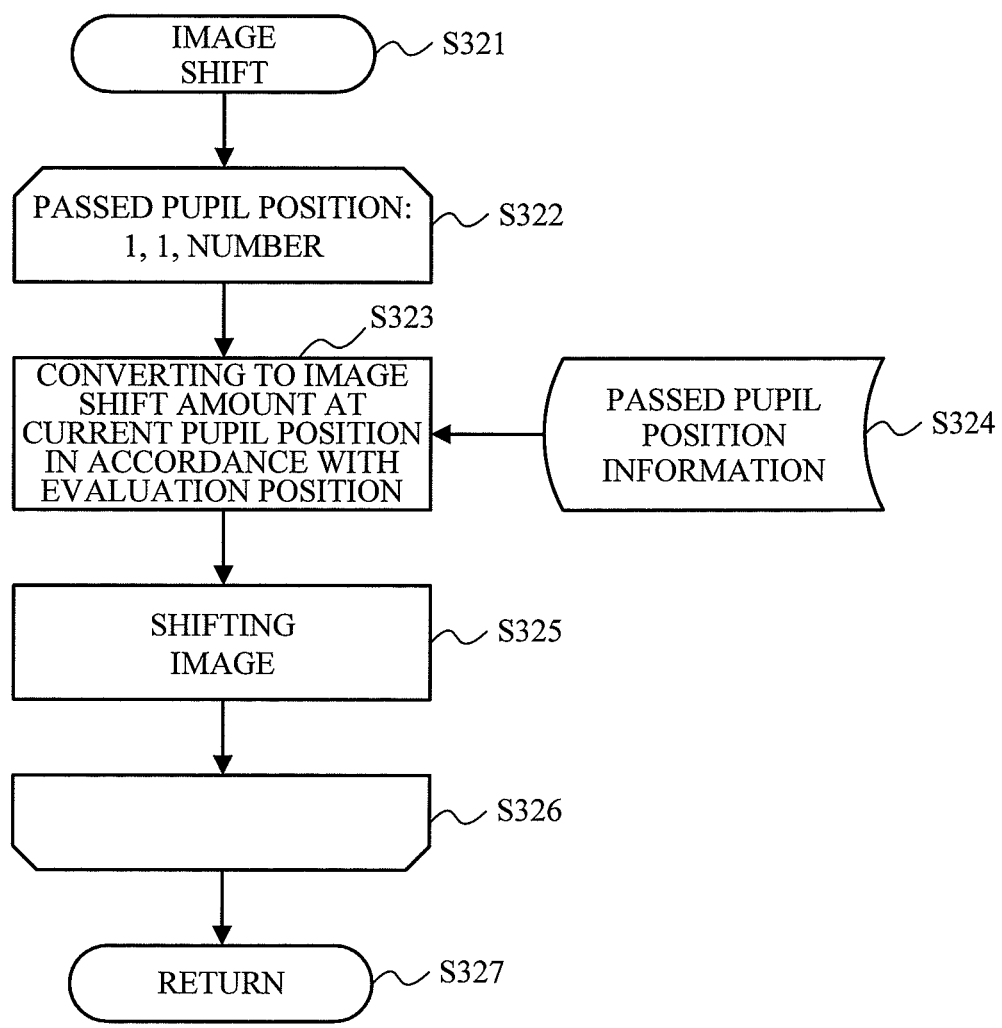
Figure 3D:
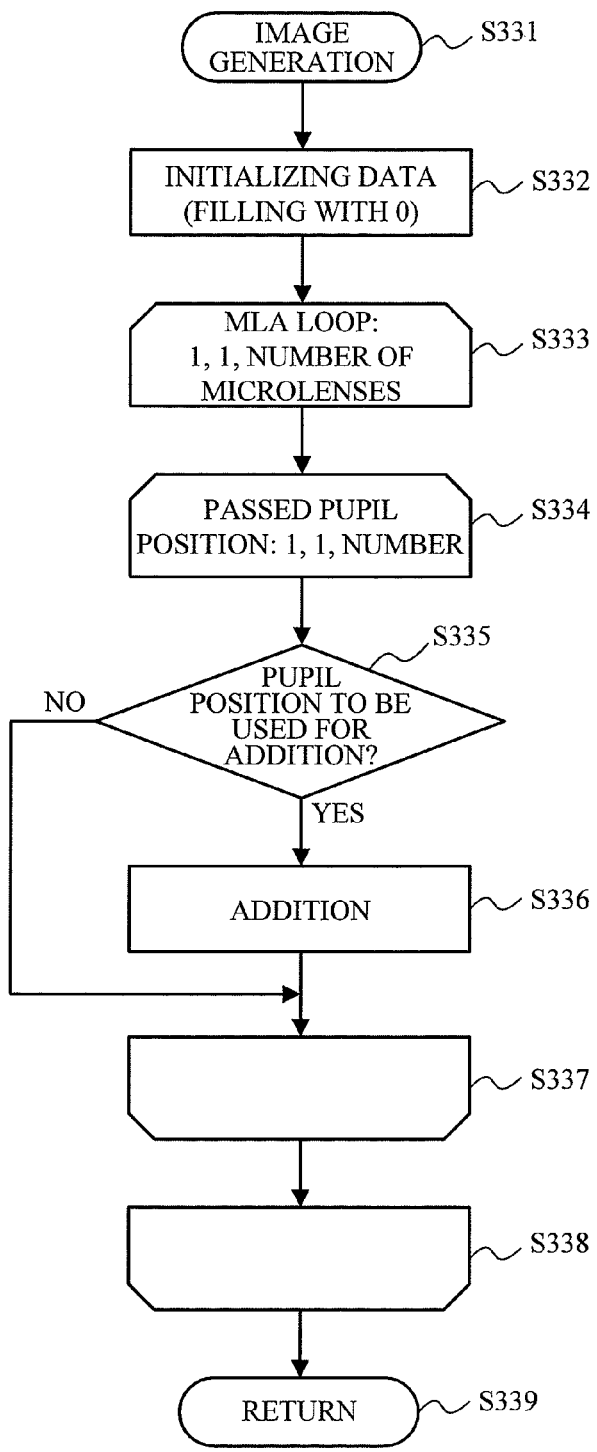
Figure 3E:
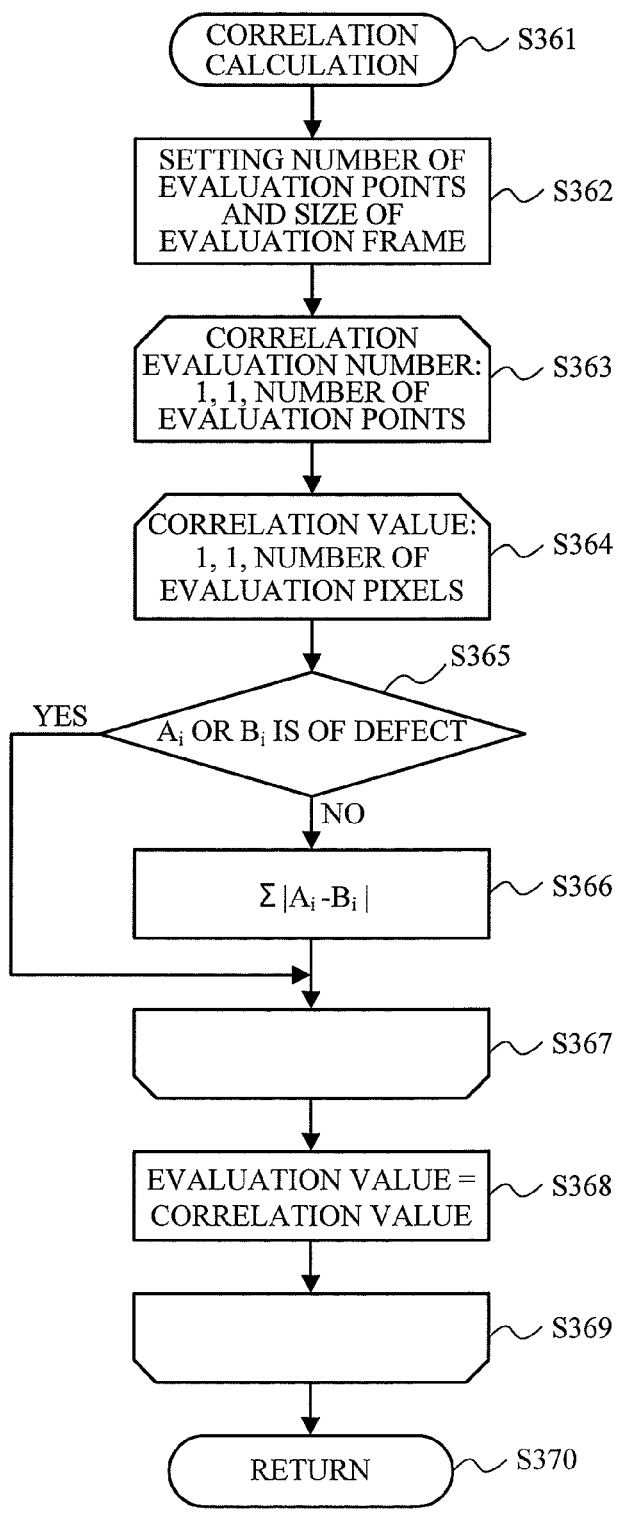

FIGS. 3A to 3E are flowcharts of a re-forming operation of an image in the camera system of the present embodiment. FIG. 3A is a flowchart illustrating an overall image re-forming operation, FIG. 3B is a flowchart illustrating an operation of a defect correction unit, FIG. 3C is a flowchart illustrating an operation of an image shift unit, FIG. 3D is a flowchart illustrating an operation of an image generation unit, and FIG. 3E is a flowchart illustrating an operation of a correlation calculation unit.

The embodiment will be described from FIG. 3A in the order of steps. Step S301 indicates starting of the image obtaining operation. For example, the operation detection unit 110 illustrated in FIG. 1 detects a specific operation from a photographer (for example, depression of a release button).

In step S302, after exposing the image pickup element 106 for an appropriate time, an image pickup signal is read and A/D converted to obtain an image signal. An image pickup condition, such as an exposure time, is set by the camera system control unit 105 in accordance with information from a photometry unit, which is not illustrated.

In step S303, the correlation calculation unit is operated to obtain a correlation calculation result. Information on the focus evaluation value is obtained from the correlation calculation unit. Details of the operation will be described below with reference to FIG. 3E.

In step S304, a focus position (image generation position) is determined for every set area (which will be described below in the description of the correlation calculation unit, but corresponds to an evaluation frame in step S362). A position where a best focus evaluation value is obtained from the correlation calculation unit, which will be described below, is determined and set as the focus position. Here, the meaning of "best" is a state where a value by a correlation calculation equation in step S366, which will be described below, is small.

However, herein, the focus position indicates a relative defocusing from a current focus position. In other words, if a focus position of an object, which is in focus at the current focus position, is zero, a focus position before or after the current focus position is obtained as a value with a plus or minus symbol. Further, a focus position is obtained, not a depth on the object side, but as a position of the focal plane on the image plane side.

In step S305, the defect correction unit is operated to obtain a result of the correction. Details of the operation of the defect correction unit will be described with reference to the flowchart of FIG. 3B.

In step S306, the image shift unit is operated to obtain a result of the image shift for generating an image. In this case, several methods are considered for the image generation position. For example, a method that defines a focus position by considering the focus positions of the areas determined in step S304 and the object recognition result together is considered. Accordingly, it is possible to focus an object recognized as an object. As another method, it is possible to assign a position designated by a user. By doing this, it is possible to achieve manual focus. Details of the operation of the image shift unit will be described below with reference to the flowchart of FIG. 3C.

In step S307, the image generation unit is operated to obtain a result of image generation. Details of the operation of the image generation unit will be described below with reference to the flowchart of FIG. 3D.

In step S308, a processing required for recording, such as conversion or compression into a recording image format, is performed on an generated image signal, and then, the image signal is recorded in the memory unit 108.

In step S309, a series of operations from the obtaining of the image signal to the recording of the image signal are completed.

Details of the operation of the defect correction unit will be described with reference to the flowchart of FIG. 3B. Step S371 indicates starting of the operation of the defect correction unit.

In step S372, defect information and a constant number $d_{max}$ are obtained from the memory unit 108. Here, $d_{max}$ is a value indicating a range of the image generation position where an appropriately re-formed image is obtained by the image generation unit and given by the following Equation.

$$d_{max} = \frac{N_\theta \Delta x}{\tan \Delta \theta} \quad (1)$$

In this case, $d_{max}$ denotes a threshold value that normally forms an image, $N_\theta$ denotes a pupil division number, $\Delta x$ denotes a pixel pitch of the image pickup element 106, and $\Delta\theta$ denotes an angle resolution. As described with reference to FIGS. 2A to 2C, these values are determined by the physical structure of the image pickup apparatus irrespectively of the photographing condition. Therefore, a value of $d_{max}$, which is calculated in advance, is stored in the memory unit 108 and then read to be used in steps S372 and S373.

The defect information refers to information on pixel defect and, specifically, to information concerning an address of a pixel in which flared highlights (a phenomenon where a luminance value is a luminance saturation value) or blocked up shadows (a phenomenon where a luminance value is obtained as zero) occur. As described above, a pixel, which outputs an abnormal luminance value generated due to the pixel defect, is referred to as a defective image. Since the defective image in which the flared highlights or blocked up shadows are generated regardless of the object may be not used for development, a processing has been usually performed by a method disclosed in the Takemura article. In this embodiment, these processings are performed in steps S374 to S380, if necessary. Further, since such a pixel is small and does not move, the defect information may be stored in the memory unit 108 and then read and used in steps S372 and S373.

Steps S374 to S380 are loop processings and processings in steps S374 to S380 are performed on all defective images.

Step S375 compares the absolute value of the focus position determined in step S304 and an absolute value (threshold value) of $d_{max}$. If the absolute value of the focus position is equal to or lower than the threshold value, which is the absolute value of $d_{max}$, the sequence proceeds to step S377 and, otherwise, the sequence proceeds to step S376.

An interpolation processing of the defective image is performed by a known technology in step S376. In other words, before performing a specific processing on image signals obtained from pixels other than the defective image, correlation of the defective image in a vertical direction or a horizontal direction is calculated, and the interpolation processing is performed in a direction having a higher correlation. In FIG. 3B, the interpolation processing is illustrated as "interpolation processing on the image pickup image (interpolation processing that uses an image signal other than an output of the image shift unit)." The interpolation may be represented by the following equation.

$$X_{i,j} = (X_{i-1,j} + X_{i+1,j})/2 \text{ if } |X_{i-1,j} - X_{i+1,j}| \leq |X_{i,j-1} - X_{i,j+1}|$$

$$X_{i,j} = (X_{i,j-1} + X_{i,j+1})/2 \text{ if } |X_{i-1,j} - X_{i+1,j}| > |X_{i,j-1} - X_{i,j+1}| \quad (2)$$

In Equation 2, a technical idea of a very basic interpolation is represented. Here, addresses of the defective images are denoted with i and j and a luminance value at the addresses i and j is denoted with $X_{i,j}$. In Equation 2, $|X_{i-1,j} - X_{i+1,j}|$ is compared with $|X_{i,j-1} - X_{i,j+1}|$, which corresponds to the determination of a direction having a higher correlation in the horizontal direction and the vertical direction. An object image in a natural image has a characteristic different from a random pattern. Even though the luminance is sharply changed in an edge direction, in many cases, a comparatively flat luminance distribution is obtained in a direction that does not have an edge. Using this characteristic, under the assumption that the luminance distribution is flat in a direction where $|X_{i-1,j} - X_{i+1,j}|$ and $|X_{i,j-1} - X_{i,j+1}|$ are small, the interpolation processing is performed. Further, even though a more advanced processing method is suggested, only fundamentals of a technical idea are suggested here.

In step S376, since the defect is corrected by the related art, a positive effect obtained by using the present invention may be not achieved. However, in step S375, an effect may be obtained by determining the absolute value of the focus position and the absolute value of $d_{max}$. Since it is understood that the defective image has an object image, which is defocused beyond $d_{max}$ (a case when it is determined to be "NO" in S375), even though the image is re-formed by a simple interpolation processing, the defective image does not affect the image. That is, in the operation of the image generation unit, which is performed in step S307, it is understood that the defective image does not cause a very serious affect (occurrence of ringing). Since defocusing beyond a range $d_{max}$ within which a re-formed image can be obtained readily results in that the re-formed image will be blurred, an image is obtained in a state where information on a radio-frequency object image is missed. In this phenomenon, it is possible to obtain a considerably good interpolation value even by the simple interpolation processing indicated by Equation 2 (here, luminance information to be obtained at $X_{i,j}$ spreads due to blurring to leak into peripheral pixels, which is synonymous with the radio frequency component being cut).

In step S377, the image shift unit is operated so as to be focused at a position of the defective image on which a current processing is performed to obtain a result. In other words, the image signal is in a state where the image shift on re-formation planes of FIGS. 5A to 5D is completed, but a processing that performs addition in a vertical direction to obtain Si is not performed. Details of the operation of the image shift unit will be described below with reference to FIG. 3C.

Figure 4A:
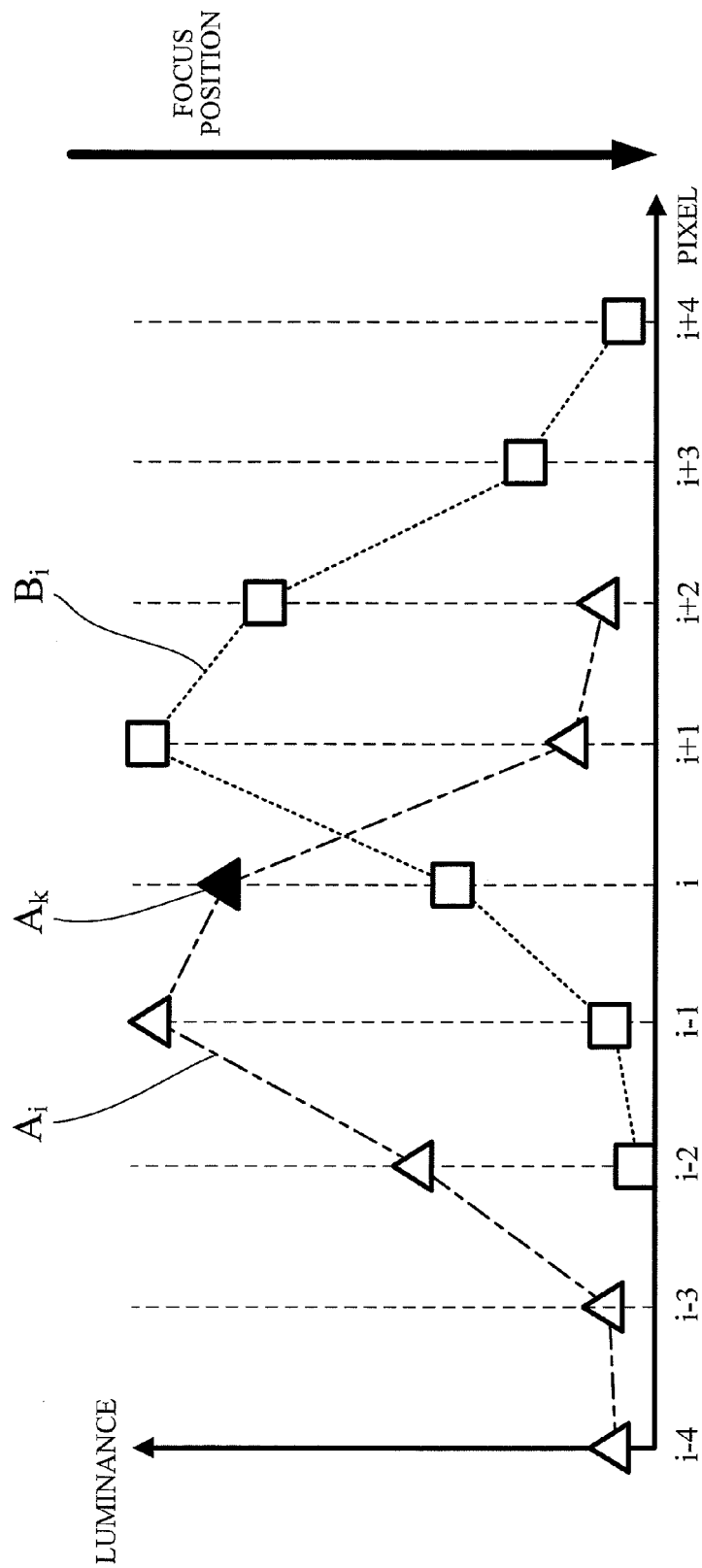
FIGS. 4A, 4B, and 4C are views conceptually illustrating focus determination in an operation of contrast AF.
Figure 4B:
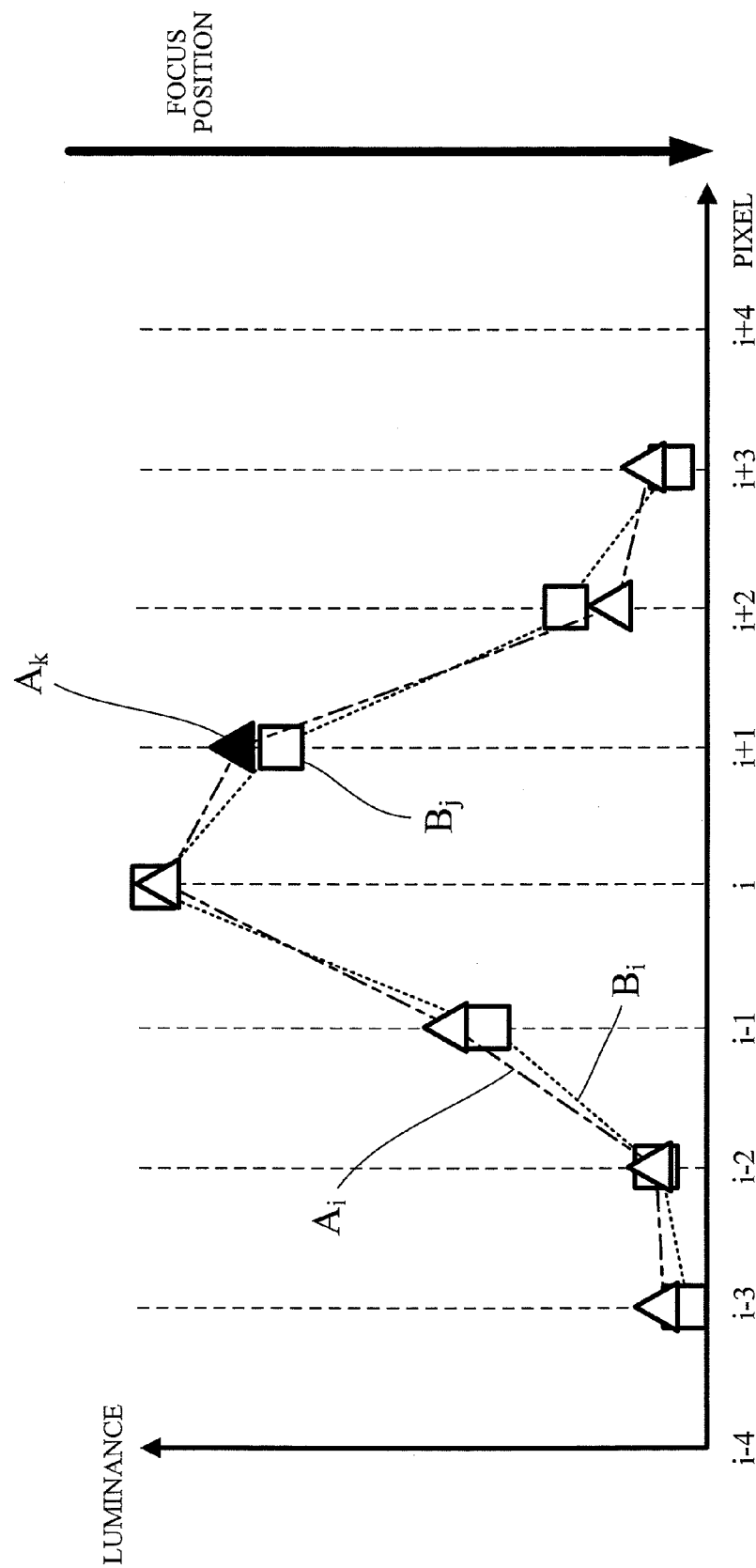
Figure 4C:
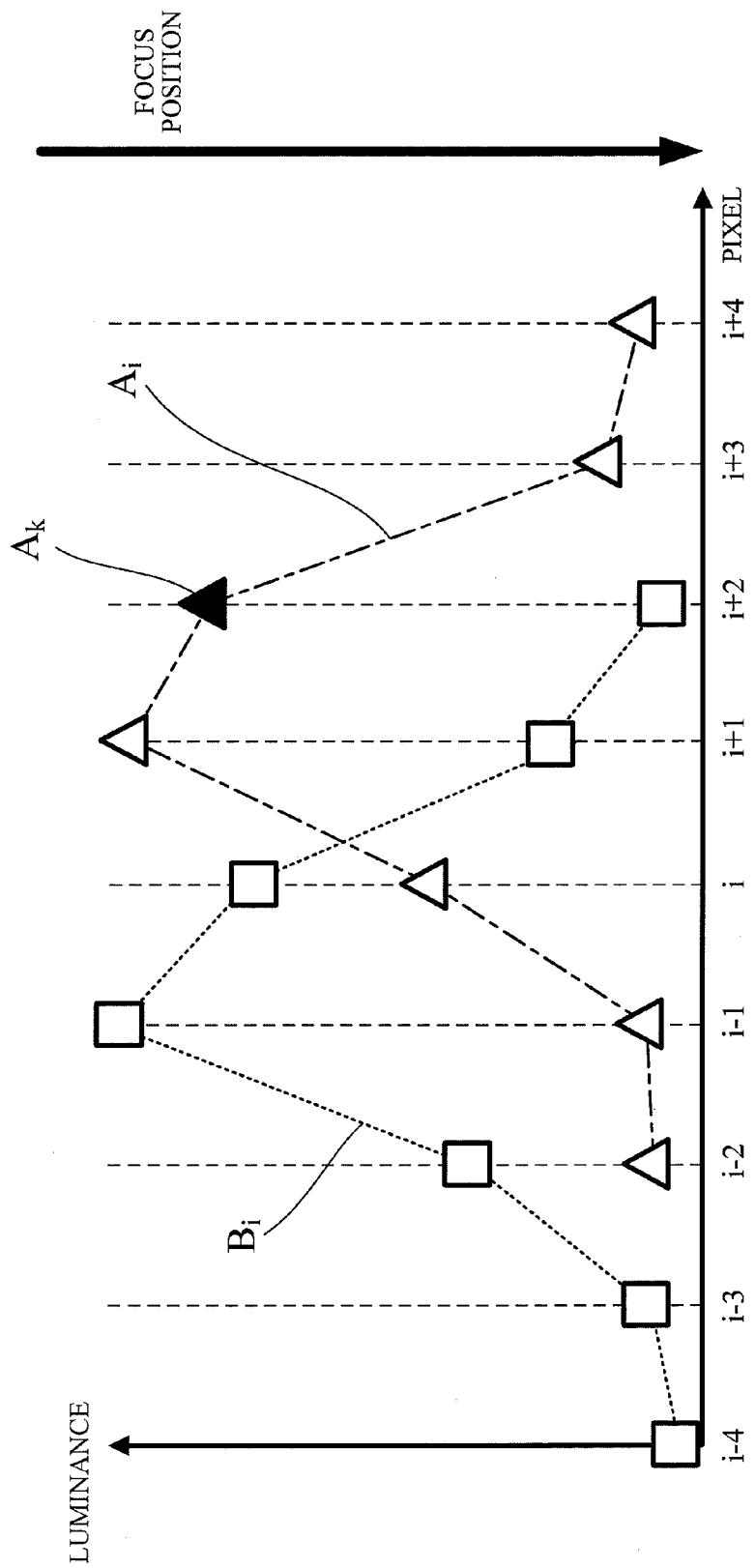

In step S378, the interpolation processing is performed on the basis of the result of the image shift obtained from step S377, which is illustrated as "interpolation processing on the shift image"), in FIG. 3B. Specifically, as a result of the operation of the image shift unit in step S377, the image is focused in the position of the defective image of the image on which the current processing is performed. In this state, as it is well known, the same information may be obtained, regardless of the pupil position to be passed. This is because a ray of light emitted from one point on the same object is focused at one point in the developed image. In this case, it is proper to perform interpolation from information that passes through apparently different pupil areas. It may easily be understood if the correlation calculation, which will be described below with reference to FIGS. 4A to 4C, is referred to (even though the simple description will be made with reference to FIGS. 4A to 4C herein, a detailed description of FIGS. 4A to 4C will be made below). In FIGS. 4A to 4C, FIG. 4B illustrates a focused state. In this case, distributions $A_i$ and $B_i$ of the luminance values of the information that passes through the different pupil areas have a similar shape. For example, if a pixel $A_k$ is a defective image, a proper processing is performed by copying a luminance value of a corresponding pixel of $B_i$ in FIG. 4B. For the sake of simplicity, FIGS. 4A to 4C illustrate information of two pupil passage areas. If the pupil division number is large, since more information from a pixel that is not defective may be obtained, another appropriate interpolation method may be used instead of copying the luminance value. As an example, it is considered to use an average value or a dispersion of the luminance values of normal pixels.

By the processings to step S379, the interpolation processing is performed using information on a focused plane (as described above, the same information may be obtained regardless of the passed pupil area) or information having good correlation (=high similarity). Therefore, an appropriate interpolation processing is performed for the defective pixel. As a result, it is possible to obtain a high quality image even in the re-formation of the image.

In step S380, the sequence returns to step S305, which is a caller of the defect correction routine.

Details of the operation of the image shift unit will be described with reference to FIG. 3C. Step S321 indicates starting of the operation of the image shift unit.

Steps S322 to S326 are loop processings. In step S322, a loop is calculated as many as the number corresponding to the pupil division number. For example, in the example illustrated in FIGS. 2A to 2C, since the exit pupil of the photographing optical system 103 is divided into twenty-five parts, calculation is performed according to twenty-five pupil positions. As will be described below with reference to FIGS. 5A to 5D, if an angle of incidence is different even on the same re-formation plane (this is substantially synonymous with a passed pupil area being different in a case when there is enough distance to the exit pupil), an amount by which an image is shifted for re-formation is varied. The loop is a loop for appropriately reflecting the above description.

In step S323, based on data from step S324, an image shift amount in the pupil area corresponding to the evaluation position is calculated. In step S324, a correspondence relationship between the pixels and the MLA is stored and information indicating the pupil area from which pupil area each pixel receives a ray of light is stored.

In step S325, on the basis of the information obtained in step S323, pixels obtaining the rays of light having the same angle of incidence (obtaining the rays of light from the same pupil area) are shifted. The pixels obtaining the rays of light having the same angle of incidence are, for example, 225a and 225b of FIGS. 2A to 2C. Such pixels are present as many as the number of micro lenses that form the MLA 200.

The image shift unit is described in more detail with reference to FIGS. 5A to 5D (which will be described below).

In step S327, the sequence returns to step S304, which is a caller of the image shift unit or step S377.

Details of the operation of the image generation unit will be described with reference to FIG. 3B.

Step S331 indicates starting of the operation of the image generation unit.

In step S332, an area where data of an addition result in step S335 is stored is initialized (filled with zero). In this case, the data area preferably has a size corresponding to the number of MLAs 200. Further, a gradation of data may be enough if the product of the gradation of original data and the pupil division number can be stored. For example, when the data is eight bits and the pupil division number is twenty-five, if the gradation of data is thirteen bits (>8 bits+log₂ 25), there is no need to consider the overflow of data.

Steps S333 to S338 are loop processings. In step S333, loop calculation is performed as many times as the number of micro lenses that form the MLA 200. For example, in the examples illustrated in FIGS. 2A to 2C, the number of pixels of the image pickup element÷twenty-five (pupil division number) provides the number of micro lenses.

Steps S334 to S337 are loop processings. In step S334, loop calculation is performed as many times as the pupil division number. For example, in the examples illustrated in FIGS. 2A to 2C, since the exit pupil is divided into twenty-five, lights from twenty-five pupil positions are processed.

In step S335, it is determined whether a pupil area is to be added. In other words, by changing the area to be added in accordance with the setting of the user, an intended image is provided. Generally, if the pupil area to be added is increased, an image may have a small depth of focus due to an excellent S/N, and if the pupil area to be added is decreased, an image may have a large depth of focus.

In step S336, addition is performed. If the shift amount is not integer times as long as the pixel, in the addition of S336, light is properly divided to be added (for example, appropriately added in accordance with the overlapping area).

The image generation unit will be more specifically described with reference to FIGS. 5A to 5D (will be described below).

In step S339, the sequence returns to step S307, which is the caller of the image generation unit.

Details of the operation of the correlation calculation unit will be described with reference to FIG. 3E.

Step S361 indicates starting of an operation of the correlation calculation unit.

In step S362, the number of evaluation points that are subjected to the evaluation and a size of the evaluation frame (for example, a frame having the evaluation point at the center thereof) are set. The evaluation point is appropriately set in accordance with the photographing condition or a type of lens 102. Further, if the evaluation frame is too large, perspective conflict in which images of objects having different distances simultaneously are evaluated may occur. Here, the evaluation frame is preferably as small as is possible within a range where the correlation may be appropriately calculated in spite of the noise. By doing this, the focus position is appropriately detected when the defect is corrected.

Steps S363 to S369 are loop processings. In step S363, arithmetic is repeatedly performed so as to obtain an evaluation value corresponding to the number of evaluation points determined in step S362.

Steps S364 to S367 are loop processings. In step S364, the correlation calculation is performed for the pixel included in the evaluation frame determined in step S362.

In step S365, it is determined that the pixel $A_i$ or $B_i$ is defective. Here, $A_i$ denotes luminance of an i-th pixel corresponding to a specific passed pupil area. $B_i$ denotes luminance of an i-th pixel corresponding to a passed pupil area, which is different from $A_i$. For example, in FIGS. 2A to 2C, $A_i$ may be formed by arranging only pixels corresponding to the pixel 222 and $B_i$ may be formed by arranging only pixels corresponding to the pixel 224. The pupil area may be determined depending on a reference length or a vignetting state of the pupil plane to select the pixel corresponding to the determined pupil area.

In step S365, if the pixel is determined to be defective, this pixel is not proper to use for the correlation calculation, so that the sequence proceeds to step S367. If the pixel is not defective, the sequence proceeds to step S366. The correlation calculation may be performed, for example, by $\Sigma |A_i - B_i|$ as represented in step S366. Further, in this embodiment, the correlation calculation is used so as to find the focus position of the defective pixel and, thus, the equation of the correlation calculation represented herein is only illustrative, and not the essence of the invention.

By setting as described above, the correlation of the images that pass through different pupil areas may be calculated and the evaluation amount may be obtained on the basis of a phase different AF. In step S368, the obtained correlation value is stored as the evaluation amount.

In the evaluation equation of $\Sigma |A_i - B_i|$ described above, a portion where the correlation value becomes smaller corresponds to a portion having a good focus state. Here, the correlation calculation is performed using a method that adds a differential absolute value. However, the correlation calculation may be performed using other calculation methods, such as a method that adds a maximum value, a method that adds a minimum value, or a method that adds a differential square value.

In step S369, the sequence returns to step S307, which is a caller of the correlation calculation unit.

An example of distribution of the luminance values corresponding to the evaluation in the correlation calculation unit described here is illustrated in FIG. 4A to 4C.

FIGS. 4A to 4C illustrate the distribution of the luminance values when the focus position is changed in this order. The horizontal axis indicates a pixel position and the vertical axis indicates the luminance value. As described above, in FIGS. 2A to 2C, Ai is formed by arranging only pixels corresponding to the pixel 222 and Bi is formed by arranging only pixels corresponding to the pixel 224. In the correlation calculation unit, for example, the evaluation is performed by the following equation.

$$C(p) = by \, \Sigma |A_{i-q} - B_{i-q}| \quad (3)$$

where summation is performed over q from 1 to the number of evaluation pixels, while excluding a defective pixel.

Here, C(p) denotes an evaluation amount of the correlation and is a correlation evaluation value of the correlation arithmetic method called SAD (sum of absolute difference), which is an example of the correlation evaluation method. Therefore, the evaluation may be performed by using other correlation arithmetic methods, for example, SSD (sum of squared difference).

In FIG. 3E, q represents a pixel that is a target of the repeating processing in the loop from step S364 to step S367. According to Equation 3, correlation of $A_i$ and $B_i$ is calculated, while shifting the corresponding pixels. As illustrated in FIGS. 5A to 5D, this case may correspond to a case when the correlation of pixel rows is obtained by deviating the adjacent pixel column, which is represented in parallel in the vertical direction in FIGS. 4A to 4C. In other words, in FIG. 4A, a peak of $A_i$ is positioned further left than a peak of $B_i$. In FIG. 4B, the peak of $A_i$ matches with the peak of $B_i$. In FIG. 4C, the peak of $A_i$ is positioned further right than the peak $B_i$, which is a behavior of an image passing through the different pupil areas when the focus position is varied.

An in-focus state is illustrated in FIG. 4B. However, in this case, the same information may be obtained regardless of the passed pupil area, which corresponds to a case when the $A_i$, and $B_i$ overlap in FIG. 4B. Ai and Bi substantially match with each other. Non-matched parts depend on a noise component and a difference of the diffusion characteristic of the light of the object.

If it is considered that a specific pixel $A_k$ is defective, in FIGS. 4A to 4C, a defect of $A_k$ may be processed using a value of a pixel $B_j$ corresponding to $A_k$ in FIG. 4B. Here, it should be noted that Bj is not necessarily a pixel adjacent to the Ak in the photographed state. As is apparent from Equation 3, if q=0, it is assumed that $B_i$ is present in the vicinity of $A_k$. However, in other cases, $B_j$ is not necessarily an adjacent pixel to the $A_k$. In the meantime, when the image is re-formed so as to be focused, $B_j$ is present in the vicinity of $A_k$. Such a pixel is specified to be used in the defect correction unit. In the present embodiment, there is no need to specify and to record the pixel. However, if a focusing position is specified, a pixel corresponding to $A_k$ is naturally determined, so that the focusing position is stored.

Next, using FIGS. 5A to 5D, the image shift and the image generation are schematically illustrated and a usability of contrast calculation by re-forming an image will be described.

Figure 5A:
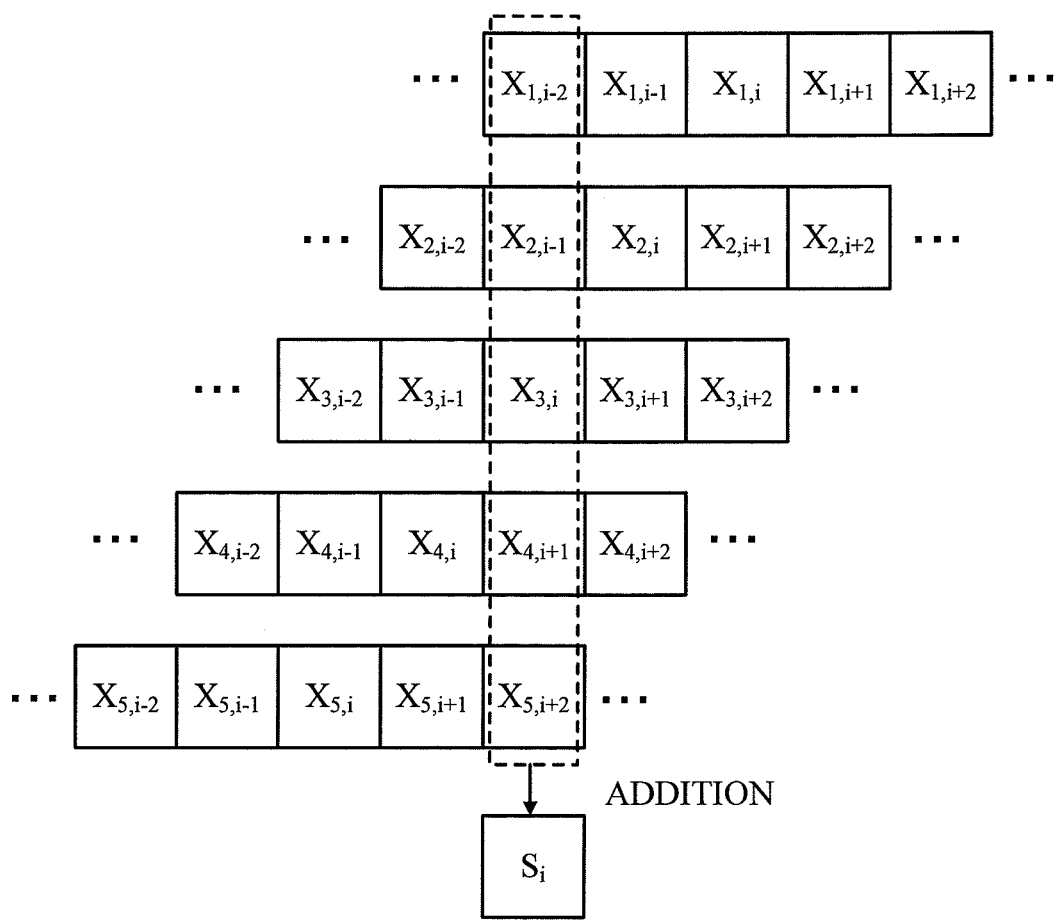
FIGS. 5A, 5B, 5C, and 5D are views schematically illustrating re-formation of an image.
Figure 5B:
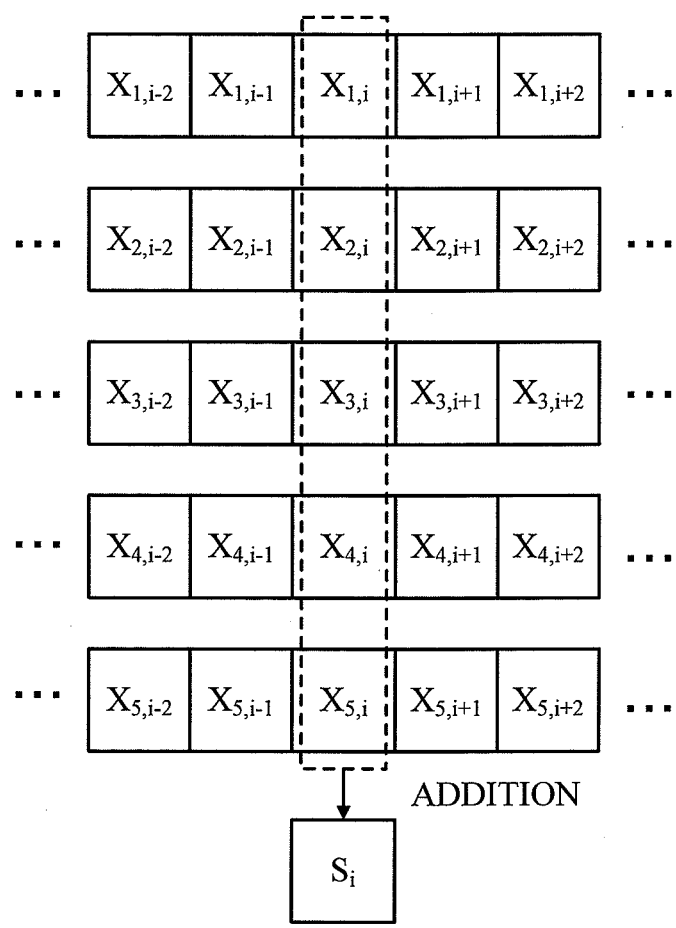
Figure 5C:
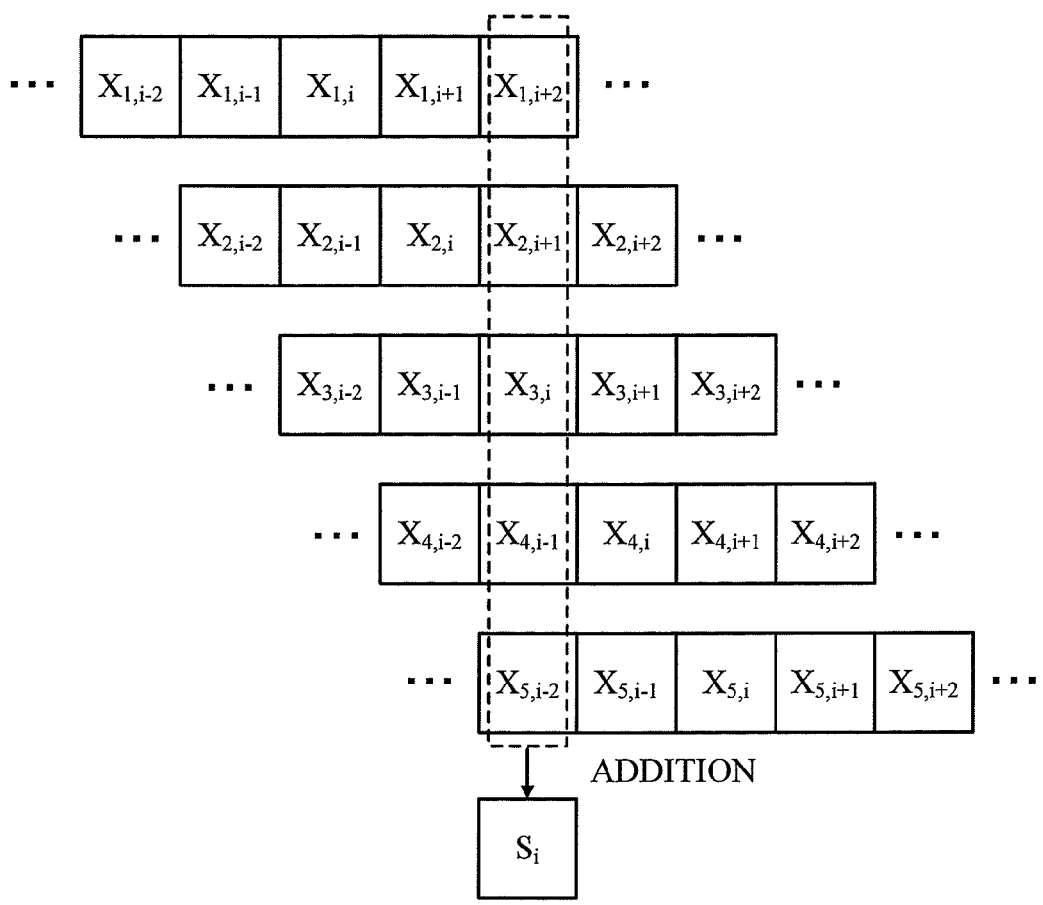
Figure 5D:
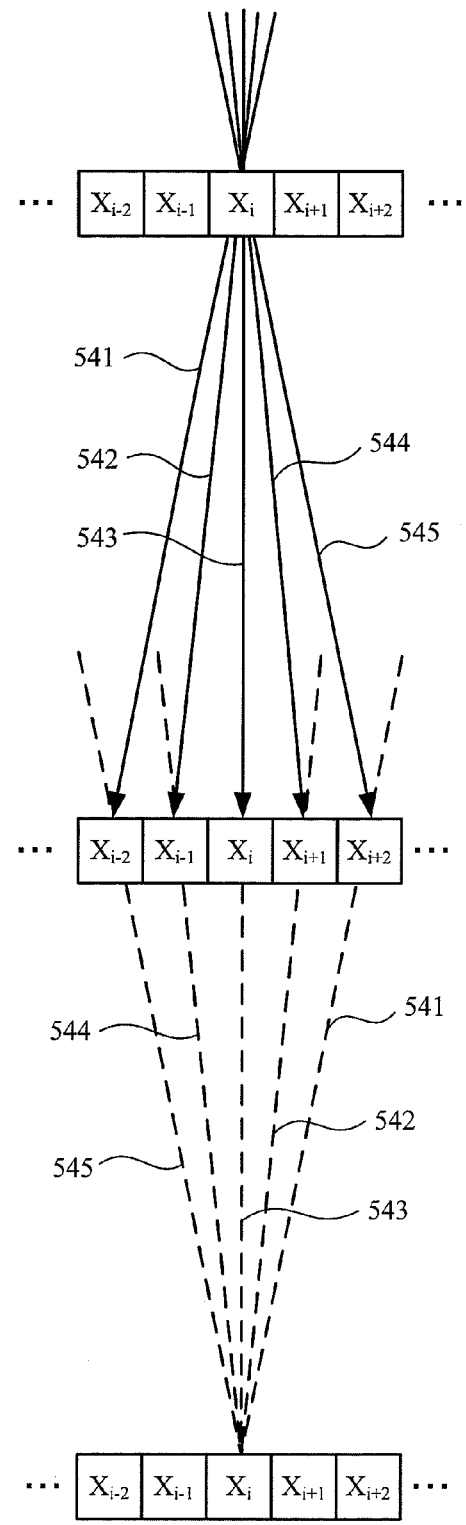

In FIGS. 5A to 5D, first, FIG. 5B illustrates a surface in which an image is obtained by the image pickup element 106, which is actually provided thereon, FIG. 5A illustrates a re-formation plane closer to the object side more than in FIG. 5B (referred to as a re-formation plane 1), FIG. 5C illustrates a re-formation plane (referred to as a re-formation plane 2), which is separated away from the object side more than in FIG. 5B. As described above, in FIGS. 5A to 5D, for the sake of a clear and brief description, the pupil division direction and the pixel arrangement are one dimensional.

In FIG. 5B, $X_{1,i}$, $X_{2,i}$, $X_{3,i}$, $X_{4,i}$, and $X_{5,i}$ indicate data obtained as light passes through the pupil areas 1, 2, 3, 4, and 5 to arrive at the micro lens $X_i$. In other words, a front part of the lower suffix indicates the passed pupil area and a rear part of the lower suffix indicates a number of the micro lens. In the relationship with a physical position, $X_{1,i}$ indicates data obtained from area 221 of FIG. 2C and $X_{2,i}$ indicates data obtained from area 222 of FIG. 2C. Further, lower suffixes 3, 4, and 5 correspond to the areas 223, 224, and 225.

In order to generate an image on an obtaining plane, as illustrated in FIG. 5B, data arriving at the micro lens Xi may be added. Specifically, an integral value in an angular direction of the light arriving at Xi may be obtained by $Si = X_{1,i} + X_{2,i} + X_{3,i} + X_{4,i} + X_{5,i}$. By performing the above operation for all of the micro lenses, an image, which is similar to a normal camera, is created.

Next, a method of generating an image on the re-formation plane 1 will be considered. As described in FIGS. 2A to 2C, in the photographing optical system of this embodiment, the light that arrives at the pixels is limited in a specific pupil area, and thus, a known angle of incidence is used. The positions of the pixels on the re-formation plane are re-formed according to the angles. Specifically, like $X_{1,i}$, if the suffix of the pupil area is 1, in FIG. 5D, the light arrives at an angle denoted by reference numeral 541. Hereafter, the suffixes 2, 3, 4, and 5 of the pupil areas correspond to reference numerals 542, 543, 544, and 545, respectively. At this time, the light that arrives at the micro lens $X_i$ on the re-formation plane 1 is dispersed into $X_{i-2}$ to $X_{i+2}$ (one dimension) so as to arrive at the obtaining plane. More specifically, the light is dispersed into $X_{1,i-2}$, $X_{2,i-1}$, $X_{3,i}$, $X_{4,i+1}$, and $X_{5,i+2}$. As to the micro lenses other than $X_i$, it can be also understood that it is required to re-form an image at the re-formation plane 1 only to shift and to add the image in accordance with the angle of incidence. In order to generate an image at the re-formation plane 1, a micro lens with a suffix 1 of the pupil area is shifted by two pixels to the right, a micro lens with a suffix 2 of the pupil area is shifted by one pixel to the right, and a micro lens with a suffix 3 of the pupil area is not shifted. Further, a micro lens with a suffix 4 of the pupil area is shifted by one pixel to the left and a micro lens with a suffix 5 of the pupil area is shifted by two pixels to the left. Therefore, the micro lenses may be shifted correspondingly to the angles of incidence. Thereafter, data at the re-formation plane 1 may be obtained by the addition in the vertical direction in FIG. 5A. Specifically, at the re-formation plane 1 of $Si = X_{1,i-2} + X_{2,i-1} + X_{3,i} + X_{4,i+1} + X_{5,i+2}$, an integral value in the angle direction of the light which arrives at $X_i$ may be obtained. Accordingly, an image at the re-formation plane 1 is obtained.

Here, at the re-formation plane 1, if it is considered that $X_i$ has a bright point, the light is dispersed onto $X_{1,i-2}$, $X_{2,i-1}$, $X_{3,i}$, $X_{4,i+1}$, and $X_{5,i+2}$ at the obtaining plane to be in a blurring state. However, if the image is generated at the re-formation plane 1, the bright point is generated on Xi again so that an image having a high contrast is obtained. In other words, by re-reforming the image to calculate the contrast, so-called contrast AF may be performed.

Further, as known from FIG. 5C, also at a re-formation plane 2, an image may be generated by just the same manner as at the re-formation plane. If the direction in which the re-formation plane is positioned is varied (which means an opposite side to the object), a shift direction only needs to be inversed.

Figure 6A:
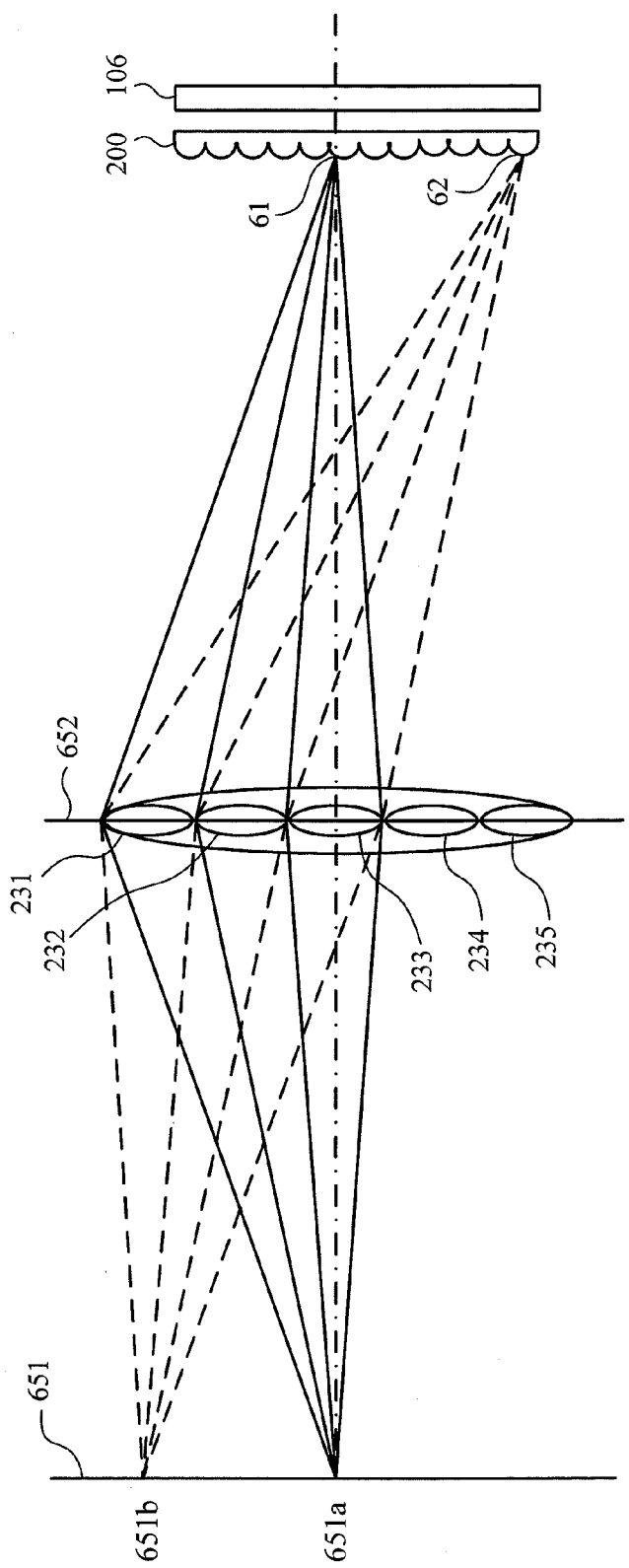
Figure 6B:
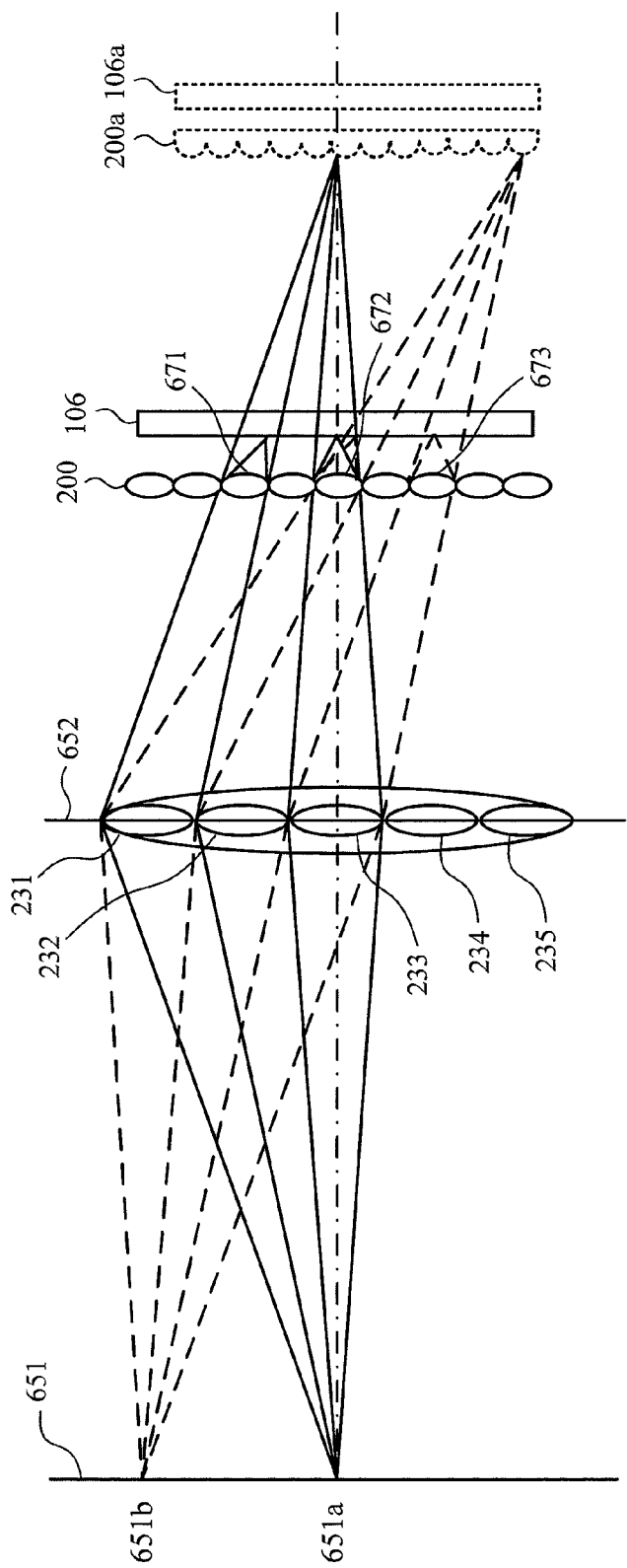

Referring to FIGS. 6A to 6C, an example that re-forms an image at a virtual focal plane in the image pickup system of FIGS. 2A to 2C will be described.

FIGS. 6A to 6C are views schematically illustrating a state when the light from an object is focused on the image pickup element 106. FIG. 6A corresponds to the focus state of the optical system described with reference to FIGS. 2A to 2C, and is an example that the MLA 200 is disposed in the vicinity of the focal plane of the photographing optical system 103. FIG. 6B is a view illustrating the focusing state when the MLA 200 is disposed closer to the object than the focal plane of the photographing optical system 103. FIG. 6C is a view illustrating the focusing state when the MLA 200 is disposed farther from the object than the focal plane of the photographing optical system 103.

In FIGS. 6A to 6C, reference numeral 106 denotes the image pickup element, reference numeral 200 denotes the MLA, reference numerals 231 to 235 denote the pupil areas used in FIGS. 2A to 2C, reference numeral 651 denotes an object plane, reference numerals 651a and 651b denote appropriate points on the object, and reference numeral 652 denotes a pupil plane of the photographing optical system. Further, reference numerals 661, 662, 671, 672, 673, 681, 682, 683, and 684 denote specific micro lenses on the MAL. Reference numeral 6a illustrated in FIGS. 6B and 6C denotes an image pickup element disposed on the virtual focal plane and reference numeral 200a denotes an MLA disposed on the virtual focal plane, which are referred to so as to clarify the correspondence relationship with FIG. 6A. Further, the light that is emitted from the point 651a on the object and passes through areas 231 and 233 on the pupil plane is represented by a solid line, and the light that is emitted from the point 651b on the object and passes through areas 231 and 233 on the pupil plane is represented by a broken line.

In the example of FIG. 6A, as described with reference to FIGS. 2A to 2C, the MLA 200 is disposed in the vicinity of the focal plane of the photographing optical system 103 so that the image pickup element 106 is conjugate with the pupil plane 652 of the photographing optical system. Further, the object plane 651 is conjugate with the MLA 200. Therefore, the light emitted from the point 651a on the object arrives at the micro lens 661 and the light emitted from the point 651b arrives at the micro lens 662. Further, the lights that pass through the areas 231 to 235 arrive at corresponding pixels provided below the micro lenses.

In the example of FIG. 6B, the micro lens 200 allows the light from the photographing optical system 3 to be focused and an image pickup element 106 is provided on the focal plane. With this arrangement, the object plane 651 is conjugate with the image pickup element 106. The light that is emitted from the point 651a on the object and passes through an area 231 on the pupil plane arrives at the micro lens 671 and the light that is emitted from the point 651a on the object and passes through an area 233 on the pupil plane arrives at the micro lens 672. The light that is emitted from the point 651b on the object and passes through an area 231 on the pupil plane arrives at the micro lens 672 and the light that is emitted from the point 651b on the object and passes through an area 233 on the pupil plane arrives at the micro lens 673. Further, the light that passes through each micro lens arrives at corresponding pixels provided below the micro lens. Therefore, the lights are focused on different positions of the image pickup element by the points on the object and the passing area on the pupil area. With the re-arrangement in a position on the virtual image pickup plane 106a, the same information as shown in FIG. 6A may be obtained. In other words, information on a passed pupil area (angle of incidence) and a position on the image pickup element may be obtained and a function as a pupil division unit may be achieved.

In an example of FIG. 6C, the micro lens 200 allows the light from the photographing optical system 3 to be refocused (refocusing means that focuses again a focused light, which is in a spread state) and an image pickup element 106 is provided on the focal plane. With this arrangement, the object plane 651 is conjugate with the image pickup element 106. The light that is emitted from the point 651a on the object and passes through an area 231 on the pupil plane arrives at the micro lens 682 and the light that is emitted from the point 651a on the object and passes through an area 233 on the pupil plane arrives at the micro lens 681. The light that is emitted from the point 651b on the object and passes through an area 231 on the pupil plane arrives at the micro lens 684 and the light that is emitted from the point 651b on the object and passes through an area 233 on the pupil plane arrives at the micro lens 683. Further, the lights that pass through the micro lenses arrive at corresponding pixels provided below the micro lenses. Similar to that shown in FIG. 6B, with the re-arrangement in a position on the virtual image pickup plane 106a, the same information as shown in FIG. 6A may be obtained. In other words, information on a passed pupil area (angle of incidence) and a position on the image pickup element may be obtained, and a function as a pupil division unit may be achieved.

In FIGS. 6A to 6C, an example that uses the MLA (phase modulation element) as the pupil division unit to obtain the position information and angle information is illustrated. However, if the position information and the angle information (equivalence to limiting the passing area of the pupil) are obtained, other optical configurations may be used. For example, a method of inserting a mask with an appropriate pattern thereon (gain modulation element) in an optical passage of the photographing optical system may be used.

As described above, according to the present embodiment, even though an image pickup element having a pixel defect is used, on the basis of the information of the light that passes through different pupil areas in the image pickup element, it is possible to obtain a high quality image in which the influence of the pixel defect is reduced.

Even though the exemplary embodiment of the present invention has been described above, the present invention is not limited to the exemplary embodiment, but may be modified or changed without departing from the gist of the invention.

Second Embodiment

Hereafter, referring to FIGS. 7A to 7C, a configuration of a camera system according to a second embodiment of the present invention will be described. In this embodiment, since the camera system has the same apparatus configuration as the configuration illustrated in FIG. 1, a description thereof will be omitted.

Figure 7A:
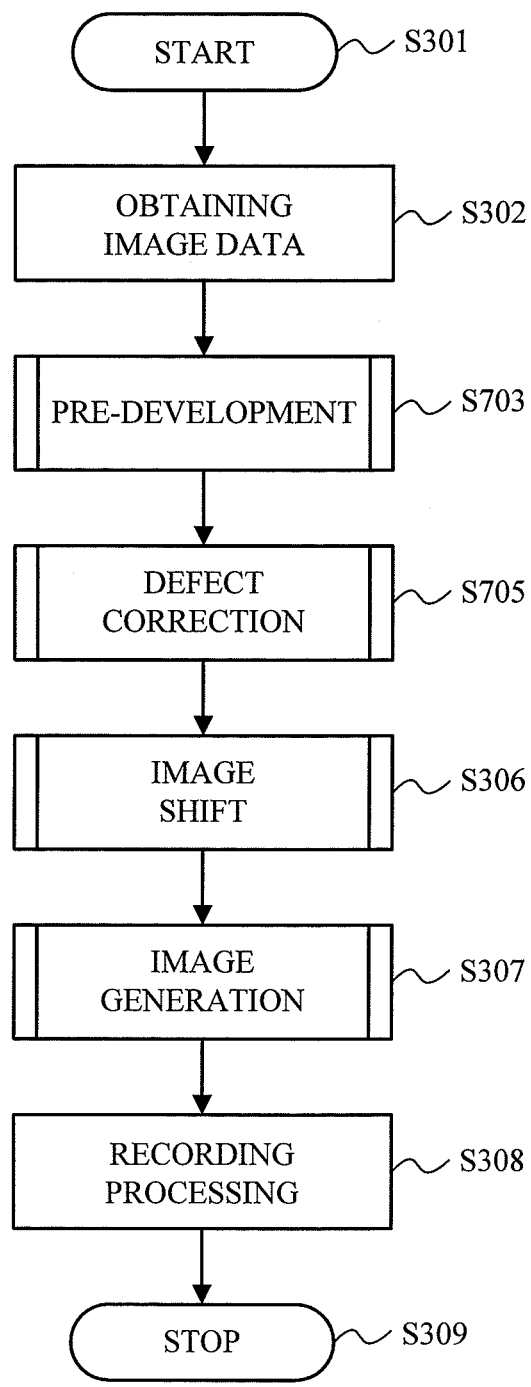
FIGS. 7A, 7B, and 7C are flowcharts of a re-forming operation of an image according to a second embodiment.
Figure 7B:
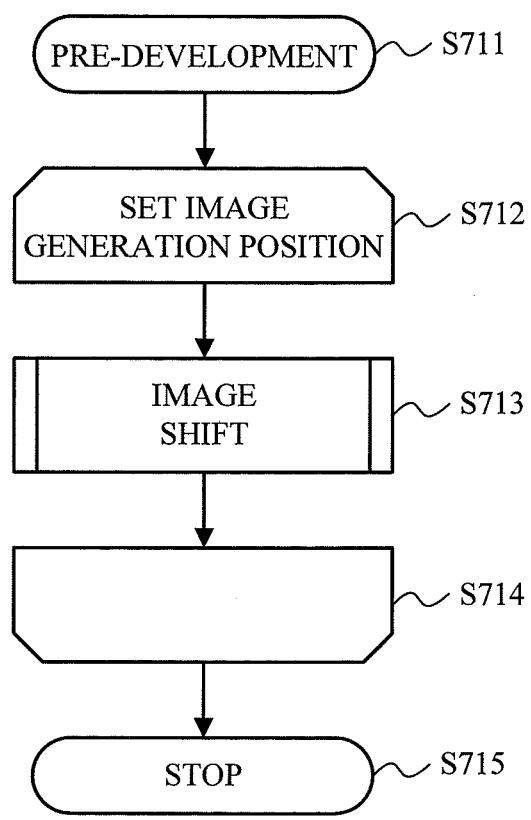
Figure 7C:
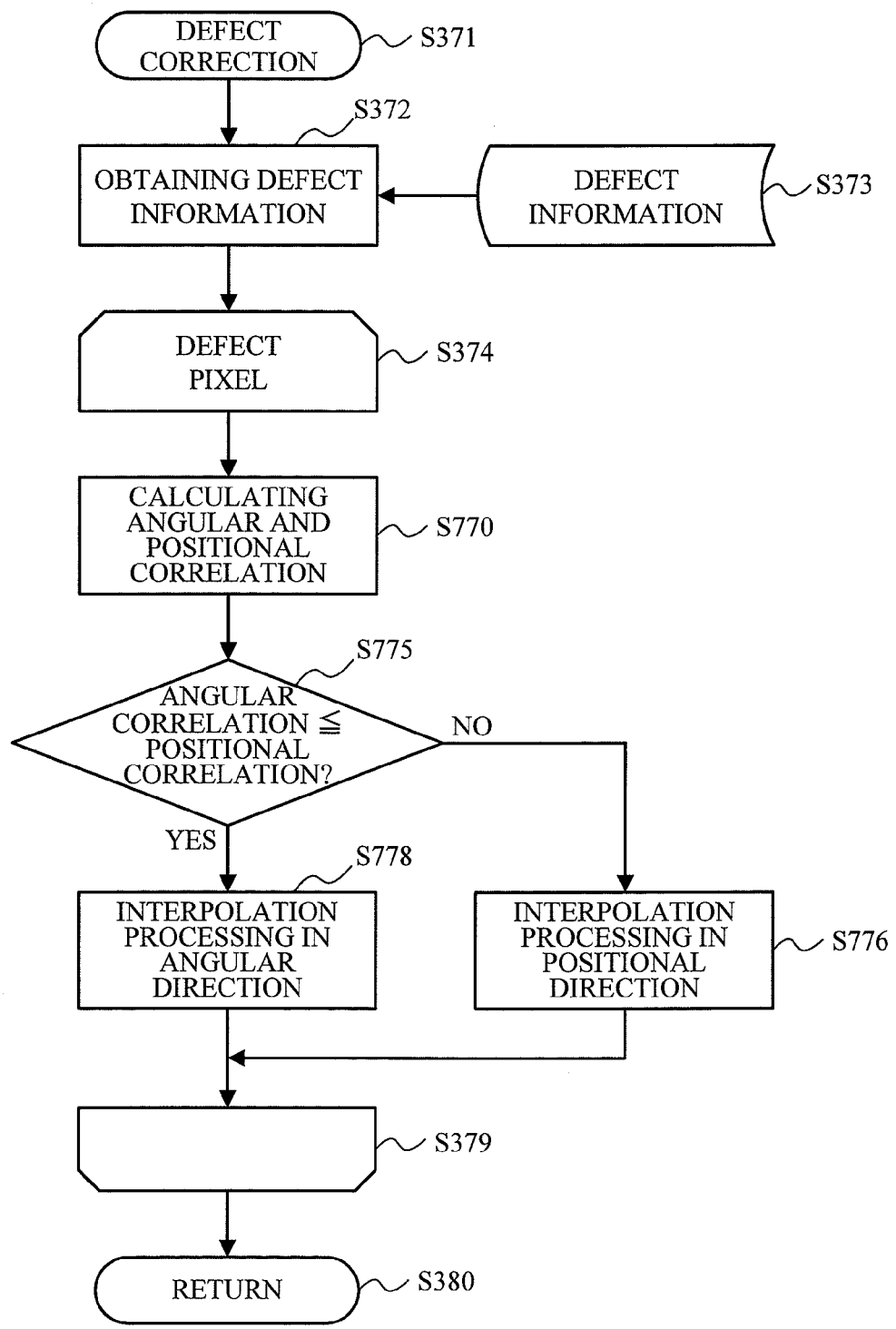

FIGS. 7A to 7C show flowcharts of an operation for obtaining a photographed image according to the second embodiment. FIG. 7A shows a flowchart illustrating an operation of the entire camera system, FIG. 7B shows a flowchart illustrating a pre-development operation, and FIG. 7C shows a flowchart illustrating an operation of a defect correction unit. In FIGS. 7A to 7C, steps that perform the same operation as in the first embodiment will be denoted with the same reference numerals as those of FIGS. 3A to 3E.

As compared with the first embodiment that changes the interpolation method depending on whether the detected focus position is within a range of dmax, in the present embodiment, performs the image shift (pre-development) under the assumption that the focus position is within a range of dmax and determines the interpolation method in accordance with the correlation of the shifted pixel value.

Steps of FIG. 7A will be described in order. Further, steps that are the same as those in the flowchart of FIGS. 3A to 3E will be denoted with same reference numerals, and a description thereof will be basically omitted.

Step S301 indicates starting of the image obtaining operation. In step S302, after exposing the image pickup element 106 for an appropriate time, an image pickup signal is read out and A/D converted to obtain image data.

In step S703, a pre-development operation is performed, which is different from the first embodiment. The pre-development will be described below with reference to FIG. 7B.

In step S705, the defect correction unit is operated. The defect correction unit of this embodiment will be described below with reference to FIG. 7C.

Steps S306 to S309 perform the same operation as those in the first embodiment. In other words, in step S306, the image shift unit is operated, in step S307, the image generation unit is operated, in step S308, the recording processing is performed and, then, in step S309, the sequence is completed.

The pre-development operation will be described with reference to FIG. 7B.

In step S711, the pre-development operation starts and the sequence proceeds to step S712.

Steps S712 to S714 are loop processings and images are generated (developed) in a plurality of set positions. As for the positions where the development is performed, a method of setting a plurality of positions within a range of $|d_{max}|$ illustrated in the first embodiment is considered to be used.

In step S713, the image shift unit operates so as to correspond to a current development position among the plurality of set positions. This operation is the same operation described in the first embodiment.

Shift images are generated in the plurality of positions by the operations performed in steps up to step S714. Since no image is added by the image generation unit, pixels are shifted in the positions where the development is performed. Compared with FIGS. 5A to 5D, the image shift on the reformation plane of FIGS. 5A to 5D is completed, but a processing that obtains $S_i$ by the addition in the vertical direction is not performed.

In step S715, the sequence returns to step S703 which is a caller of the pre-development routine.

The defect correction unit in the present embodiment will be described with reference to FIG. 7C. Step S371 indicates starting of the operation of the defect correction unit.

Steps S372 and S373 indicate the manipulation that reads out the defect information from the memory unit 108. As described in the first embodiment, since the defect information is fixed, the defect information is stored to be used in this step.

Steps S374 to S378 are loop processings, and indicate that the interpolation processing of the present embodiment is performed on all of the defective pixels.

In step S770, correlation of an angle (angle of incidence of the light) and a position (pixel value) is calculated. The correlation of the angle and the correlation of the position in this embodiment will be defined using the reference numerals of FIGS. 5A to 5D.

$$(\text{angular correlation})_{p,i} = |X_{p-1,j} - X_{p+1,j}|$$

$$(\text{positional correlation})_{p,i} = |x_{p,i-1} - X_{p,i+1}| \quad (4)$$

Where, p and i are suffixes corresponding to the angle and the position, respectively. And, even though both the angle and the position are one-dimensionally illustrated for the convenience of the description, both may be considered as two-dimensional in the actual camera. In this case, it is possible to simply perform expansion. For example, if the suffixes of the angle are p and q, and suffixes of the position are i and j, they may be represented by following equations.

$$(\text{angular correlation in } p \text{ direction})_{p,q,i,j} = |X_{p-1,q,i,j} - X_{p+1,q,i,j}|$$

$$(\text{angular correlation in } q \text{ direction})_{p,q,i,j} = |X_{p,q-1,i,j} - X_{p,q+1,i,j}|$$

$$(\text{positional correlation in } i \text{ direction})_{p,q,i,j} = |X_{p,q,i-1,j} - X_{p,q,i+1,j}|$$

$$(\text{positional correlation in } j \text{ direction})_{p,q,i,j} = |X_{p,q,i,j-1} - X_{p,q,i,j+1}| \quad (5)$$

In Equations 4 and 5, the correlation is calculated at adjacent angles (micro lenses), and in a positional (pixel) direction. If the calculation method described above is used, there are advantages in that the correlation is simply calculated and the correlation of the position and the correlation of the angle are treated in the same dimension.

Further, the arithmetic method of the correlation is not limited thereto, but other methods may be used. For example, the correlation of the angle, $$(\text{angular correlation})_{p,i} = \Sigma_q \Sigma_r |X_{q,1} - X_{r,i}| \quad (6)$$

where summations are performed over q from 1 to $N_\theta$ and r from 1 to $N_\theta$, while excluding defective pixels.

According to Equation 6, it is possible to know how much the values of the pixels other than the defective pixels are similar to each other. Further, if Equation 6 is divided by an addition number to be normalized, the correlation of the angle may be treated in the same dimension as the correlation of the position.

In step S775, the correlation of the angle is compared with the correlation of the position. If the correlation value of the angle is equal to or less than the correlation value of the position, the sequence proceeds to step S778. In contrast, if the correlation of the angle is larger than the correlation of the position, the sequence proceeds to step S776.

In step S776, the interpolation processing in the positional direction is performed, which is the same as the processing in step S376 of the first embodiment and performed by Equation 2.

In step S778, the interpolation processing in the angular direction is performed, which may be defined by the following Equation.

$$X_{p,i} = (X_{p-1,i} + X_{p+1,i})/2 \quad (p-1 \geq \text{ and } p+1 \leq N_\theta)$$

$$X_{p,i} = X_{p-1,i} \quad (p+1 > N)$$

$$X_{p,i} = X_{p+1,i} \quad (p-1 < 1) \quad (7)$$

If there is information on adjacent angles, information at both sides is used to perform the interpolation. If there is no information at both sides, information at the other adjacent side is used to perform the interpolation.

By the processings up to step S379, since the interpolation processing is performed using information having a good correlation (=high similarity), an appropriate interpolation processing is performed for the defective pixel. As a result, it is possible to obtain a high quality image.

In step S380, the sequence returns to step S305, which is a caller of the defect correction routine.

Also, in the above-described present embodiment, when an image pickup element that obtains information of the lights passing through different pupil areas is used, even if the image pickup element includes the pixel defect, it is possible to obtain a high quality image in which the influence of the defect is reduced.

As described above, even though the exemplary embodiments of the present invention have been described above, the present invention is not limited to the exemplary embodiments, but may be modified or changed without departing from the gist of the invention.

Further, a program for achieving the functions of the processings illustrated in FIGS. 3A to 3E and FIGS. 7A to 7C is recorded in a computer readable recording medium, and the program recorded in the recording medium is read out and executed by a computer system to perform the processings. Here, the "computer system" includes an operating system (OS) or hardware, such as peripheral equipment. Specifically, the program read out from the recording medium may be written in a memory provided in a functionality expansion board, which is inserted in the computer or a functionality expansion unit connected to the computer. A case when, on the basis of the instruction of the program, a CPU provided in the functionality expansion board or the functionality expansion unit performs a part of or all of the actual processings and, thus, the function of the above-described embodiment is achieved by the processings, is also included in the scope of the present invention.

Further, a "computer readable recording medium" refers to a portable medium, such as a flexible disk, a magneto-optical disk, a ROM, or a CD-ROM, and a storage device, such as a hard disk, which is built in the computer system. Further, a computer readable recording medium may include a device that stores a program for a predetermined time, such as a volatile memory (RAM) in a computer system that serves as a server or a client when a program is transmitted through a network, such as the Internet or a communication line, such as telephone line.

The program may be transmitted to other computer systems through a transmission medium from a computer system that stores the program in a storage device or by a transmitted wave in the transmission medium. Here, the "transmission medium" that transmits the program refers to a medium having a function that transmits information, such as a network (communication network), such as the Internet, or a communication line (communication wire), such as a telephone line.

Further, the program may achieve a part of the above-mentioned functions. Further, the program may be a differential file (differential program) that implements the function by being combined with a program that is already recorded in the computer system.

Further, a program product, such as the computer readable recording medium in which the program is recorded, may be applied as an exemplary embodiment of the present invention. The program, the recording medium, the transmission medium, and the program product are also included in the scope of the invention.

The present invention has been described with reference to exemplary embodiments. The present invention is not limited to the above-described embodiments, but various modifications are possible within the scope described in the claims.

I claim:

1. An image processing apparatus comprising:
at least one processor and a memory cooperatively coupled to function as:
an obtaining unit that obtains an image signal of an image pickup element having a pupil divider that restricts light of an optical image of an object arriving at each pixel of the image pickup element to light from a specific pupil area of a photographing lens that photographs the object;
a memory unit that stores information of a pixel defect of the image pickup element;
an image shift unit that determines a shift amount of the image signal of the photographed object corresponding to an image re-formation plane for every pupil area, to shift the image signal on the basis of the image re-formation plane;
a defect correction unit that corrects an image signal of a defective pixel using the shifted image signal of a pixel other than the defective pixel obtained by the image shift unit, in accordance with the information of the pixel defect, wherein the defect correction unit calculates a correlation of a position and an angle using the image signal obtained from the image shift unit, and corrects the image signal of the pixel defect using the image signal obtained from the image shift unit on the basis of the calculated correlation; and
an image re-formation unit that re-forms an image corresponding to the image re-formation plane from the image signal that is corrected by the defect correction unit.

2. The image processing apparatus according to claim 1, further comprising the image pickup element that photoelectrically converts the optical image of the object to be photographed, arriving through the photographing lens, and outputs the image signal of the photographed object.

3. The image processing apparatus according to claim 1, further comprising a setting unit that sets the image re-formation plane on which an image is re-formed from the image signal of the photographed object, wherein the at least one processor functions as the setting unit.

4. The image processing apparatus according to claim 1, wherein the defect correction unit corrects the image signal of the defective pixel by interpolation processing in an angular direction when a calculated correlation value of the angle is equal to or less than a calculated correlation value of the position, and corrects the image signal of the defective pixel by the interpolation processing in a positional direction when a calculated correlation value of the angle is greater than a calculated correlation value of the position.

5. The image processing apparatus according to claim 1, further comprising a correlation calculation unit that calculates a difference of an image signal corresponding to a different pupil area, using the image signal that is not shifted by the image shift unit,
wherein the image re-formation unit sets an image re-formation plane based on the result of the correlation calculation of the correlation calculation unit, the at least one processor functions as the correlation calculation unit.

6. The image processing apparatus according to claim 1, wherein the memory unit stores a threshold value defined by the following equation:

threshold value=(pupil division number)×(pixel interval of image pickup element)/tan(angle difference from adjacent pupil area), and
the image processing apparatus further comprises a setting unit that includes a unit that sets the image re-formation plane within a range of the threshold value, wherein the at least one processor functions as the unit of the setting unit.

7. The image processing apparatus according to claim 1, wherein the pupil divider is a micro lens array that is disposed on a light receiving surface of the image pickup element, the micro lens array dividing a plurality of pixels formed on the light receiving surface of the image pickup element into a plurality of pixel groups corresponding to each micro lens, and the micro lens allowing each pixel of the corresponding pixel groups to correspond to the lights from different pupil areas of the photographing lens.

8. The image processing apparatus according to claim 1, wherein the memory unit stores the threshold value defined by the following equation:

threshold value=(pupil division number)×(pixel interval of image pickup element)/tan(angle difference from adjacent pupil area), and
the defect correction unit compares the image re-formation plane with the threshold value and changes a method of correcting the image signal in accordance with a comparison result.

9. An image processing apparatus comprising:
at least one processor and a memory cooperatively coupled to function as:
an obtaining unit that obtains an image signal of an image pickup element having a pupil divider that restricts light of an optical image of an object arriving at each pixel of the image pickup element to light from a specific pupil area of a photographing lens that photographs the object;
a memory unit that stores information of a pixel defect of the image pickup element;
an image shift unit that determines a shift amount of the image signal of the photographed object corresponding to an image re-formation plane for every pupil area, to shift the image signal on the basis of the image re-formation plane;
a defect correction unit that corrects an image signal of a defective pixel using the shifted image signal of a pixel other than the defective pixel obtained by the image shift unit, in accordance with the information of the pixel defect; and
an image re-formation unit that re-forms an image corresponding to the image re-formation plane from the image signal that is corrected by the defect correction unit,
wherein the defect correction unit corrects the image signal of the defective pixel using an output of the image shift unit if the image re-formation plane is equal to or less than a threshold value, and corrects the image signal of the defective pixel using an image signal other than the output of the image shift unit if the image re-formation plane is greater than the threshold value.

10. A method of controlling an image processing apparatus, the method comprising:
an obtaining step that obtains an image signal of an image pickup element having a pupil divider that restricts light of an optical image of an object arriving at each pixel of the image pickup element to light from a specific pupil area of a photographing lens that photographs the object;
a storing step that stores information of a pixel defect of the image pickup element;
an image shift step that determines a shift amount of the image signal of the photographed object corresponding to an image re-formation plane for every pupil area, to shift the image signal on the basis of the image re-formation plane;
a defect correcting step that corrects an image signal of a defective pixel using the shifted image signal of a pixel other than the defective pixel, obtained in the image shift step, in accordance with the information of the pixel defect, wherein the defect correcting step calculates a correlation of the position and the angle using the image signal obtained from the image shift unit, and corrects the image signal of the pixel defect using the image signal obtained from the image shift unit on the basis of the calculated correlation; and
an image re-formation step that re-forms an image corresponding to the image re-formation plane from the image signal that is corrected in the defect correcting step.

11. The method of controlling an image processing apparatus according to claim 10, further comprising photoelectrically converting, by the image pickup element, the optical image of the object to be photographed, arriving through the photographing lens, and outputting the image signal of the photographed object.

12. The method of controlling an image processing apparatus according to claim 10, further comprising a setting step that sets the image re-formation plane on which an image is re-formed from the image signal of the photographed object.

13. The method of controlling an image processing apparatus according to claim 10, wherein the defect correcting step corrects the image signal of the defective pixel by interpolation processing in an angular direction when a calculated correlation value of the angle is equal to or less than a calculated correlation value of the position, and corrects the image signal of the defective pixel by the interpolation processing in a positional direction when a calculated correlation value of the angle is greater than a calculated correlation value of the position.

14. The method of controlling an image processing apparatus according to claim 10, further comprising a correlation calculation step that calculates a difference of an image signal corresponding to a different pupil area, using the image signal that is not shifted by the image shift unit,
wherein the image re-formation step sets an image re-formation plane based on the result of the correlation calculation of the correlation calculation step.

15. The method of controlling an image processing apparatus according to claim 10, wherein the storing step stores a threshold value defined by the following equation:

threshold value=(pupil division number)×(pixel interval of image pickup element)/tan(angle difference from adjacent pupil area), the method further comprising a setting step that sets the image re-formation plane within a range of the threshold value.

16. The method of controlling an image processing apparatus according to claim 10, wherein the pupil divider is a micro lens array that is disposed on a light receiving surface of the image pickup element, the micro lens array dividing a plurality of pixels formed on the light receiving surface of the image pickup element into a plurality of pixel groups corresponding to each micro lens, and the micro lens allowing each pixel of the corresponding pixel groups to correspond to the lights from different pupil areas of the photographing lens.

17. The method of controlling an image processing apparatus according to claim 10, wherein the storing step stores the threshold value defined by the following equation:

threshold value=(pupil division number)×(pixel interval of image pickup element)/tan(angle difference from adjacent pupil area), and the defect correcting step compares the image re-formation plane with the threshold value and changes a method of correcting the image signal in accordance with a comparison result.

18. A method of controlling an image processing apparatus, the method comprising:
    an obtaining step that obtains an image signal of an image pickup element having a pupil divider that restricts light of an optical image of an object arriving at each pixel of the image pickup element to light from a specific pupil area of a photographing lens that photographs the object;
    a storing step that stores information of a pixel defect of the image pickup element;
    an image shift step that determines a shift amount of the image signal of the photographed object corresponding to an image re-formation plane for every pupil area, to shift the image signal on the basis of the image re-formation plane;
    a defect correction step that corrects an image signal of a defective pixel using the shifted image signal of a pixel other than the defective pixel obtained by the image shift unit, in accordance with the information of the pixel defect; and
    an image re-formation step that re-forms an image corresponding to the image re-formation plane from the image signal that is corrected by the defect correction unit,
    wherein the defect correcting step corrects the image signal of the defective pixel using an output of the image shift unit if the image re-formation plane is equal to or less than a threshold value, and corrects the image signal of the defective pixel using an image signal other than the output of the image shift unit if the image re-formation plane is greater than the threshold value.

19. A non-transitory computer readable storing medium storing a program comprising a code for causing a computer to execute a method for controlling an image processing apparatus, the method comprising:
    an obtaining step that obtains an image signal of an image pickup element having a pupil divider that restricts light of an optical image of an object arriving at each pixel of the image pickup element to light from a specific pupil area of a photographing lens that photographs the object;
    a storing step that stores information of a pixel defect of the image pickup element;
    an image shift step that determines a shift amount of the image signal of the photographed object corresponding to an image re-formation plane for every pupil area, to shift the image signal on the basis of the image re-formation plane;
    a defect correcting step that corrects an image signal of a defective pixel using the shifted image signal of a pixel other than the defective pixel, obtained in the image shift step, in accordance with the information of the pixel defect, wherein the defect correcting step calculates a correlation of the position and the angle using the image signal obtained from the image shift unit, and corrects the image signal of the pixel defect using the image signal obtained from the image shift unit on the basis of the calculated correlation; and
    an image re-formation step that re-forms an image corresponding to the image re-formation plane from the image signal that is corrected in the defect correcting step.

20. The non-transitory computer readable storing medium according to claim 19, the method further comprising photoelectrically converting, by the image pickup element, the optical image of the object to be photographed, arriving through the photographing lens, and outputting the image signal of the photographed object.

21. The non-transitory computer readable storing medium according to claim 19, the method further comprising a setting step that sets the image re-formation plane on which an image is re-formed from the image signal of the photographed object.

22. The non-transitory computer readable storing medium according to claim 19, wherein the defect correcting step corrects the image signal of the defective pixel by interpolation processing in an angular direction when a calculated correlation value of the angle is equal to or less than a calculated correlation value of the position, and corrects the image signal of the defective pixel by the interpolation processing in a positional direction when a calculated correlation value of the angle is greater than a calculated correlation value of the position.

23. The non-transitory computer readable storing medium according to claim 19, the method further comprising a correlation calculation step that calculates a difference of an image signal corresponding to a different pupil area, using the image signal that is not shifted by the image shift unit,
    wherein the image re-formation step sets an image re-formation plane based on the result of the correlation calculation of the correlation calculation step.

24. The non-transitory computer readable storing medium according to claim 19, wherein the storing step stores a threshold value defined by the following equation:

threshold value=(pupil division number)×(pixel interval of image pickup element)/tan(angle difference from adjacent pupil area), the method further comprising a setting step that sets the image re-formation plane within a range of the threshold value.

25. The non-transitory computer readable storing medium according to claim 19, wherein the pupil divider is a micro lens array that is disposed on a light receiving surface of the image pickup element, the micro lens array dividing a plurality of pixels formed on the light receiving surface of the image pickup element into a plurality of pixel groups corresponding to each micro lens, and the micro lens allowing each pixel of the corresponding pixel groups to correspond to the lights from different pupil areas of the photographing lens.

26. The non-transitory computer readable storing medium according to claim 19, wherein the storing step stores the threshold value defined by the following equation:

threshold value=(pupil division number)×(pixel interval of image pickup element)/tan(angle difference from adjacent pupil area), and the defect correcting step compares the image re-formation plane with the threshold value and changes a method of correcting the image signal in accordance with a comparison result.

27. A non-transitory computer readable storing medium storing a program comprising a code for causing a computer to execute a method for controlling an image processing apparatus, the method comprising:

an obtaining step that obtains an image signal of an image pickup element having a pupil divider that restricts light of an optical image of an object arriving at each pixel of the image pickup element to light from a specific pupil area of a photographing lens that photographs the object;

a storing step that stores information of a pixel defect of the image pickup element;

an image shift step that determines a shift amount of the image signal of the photographed object corresponding to an image re-formation plane for every pupil area, to shift the image signal on the basis of the image re-formation plane;

a defect correcting step that corrects an image signal of a defective pixel using the shifted image signal of a pixel other than the defective pixel, obtained in the image shift step, in accordance with the information of the pixel defect; and an image re-formation step that re-forms an image corresponding to the image re-formation plane from the image signal that is corrected in the defect correcting step, wherein the defect correcting step corrects the image signal of the defective pixel using an output of the image shift unit if the image re-formation plane is equal to or less than a threshold value, and corrects the image signal of the defective pixel using an image signal other than the output of the image shift unit if the image re-formation plane is greater than the threshold value.

\* \* \* \* \*